United States Patent
Iizuka et al.

(10) Patent No.: US 8,559,815 B2
(45) Date of Patent: Oct. 15, 2013

(54) OPTICAL TRANSMISSION APPARATUS AND FAULT DETECTION METHOD

(75) Inventors: Hiroshi Iizuka, Kawasaki (JP); Tsukasa Takahashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 430 days.

(21) Appl. No.: 12/815,898

(22) Filed: Jun. 15, 2010

(65) Prior Publication Data

US 2010/0322619 A1 Dec. 23, 2010

(30) Foreign Application Priority Data

Jun. 18, 2009 (JP) .................. 2009-145678

(51) Int. Cl.
*H04B 10/00* (2013.01)
(52) U.S. Cl.
USPC .......................................................... 398/29
(58) Field of Classification Search
USPC ..................................................... 398/9–38
See application file for complete search history.

(56) References Cited

U.S. PATENT DOCUMENTS

| | | | |
|---|---|---|---|
| 5,608,562 A | 3/1997 | Delavaux et al. | |
| 7,215,464 B1 * | 5/2007 | Komaki et al. | 359/341.44 |
| 2008/0231843 A1 | 9/2008 | Nagayoshi et al. | |

FOREIGN PATENT DOCUMENTS

| | | |
|---|---|---|
| JP | 07-327012 | 12/1995 |
| JP | 10-209543 | 8/1998 |
| JP | 2003-143080 | 5/2003 |
| JP | 2008-236312 | 10/2008 |

OTHER PUBLICATIONS

Japanese Office Action mailed Apr. 16, 2013 in corresponding Japanese Patent Application No. 2009-145678 (4 pages).

* cited by examiner

*Primary Examiner* — Danny Leung
(74) *Attorney, Agent, or Firm* — Staas & Halsey LLP

(57) ABSTRACT

An optical transmission apparatus includes a non-reciprocal device including first to second ports, an optical signal input from the first port being provided to the second port, an optical signal input from the second port being provided to the first port, a dispersion compensator that is coupled to the first port of the non-reciprocal device and that conducts given processing to an optical signal input from the first port of the non-reciprocal device to provide the optical signal subjected to the given processing to the second port of the non-reciprocal device, a first monitor, a second monitor, and a fault determination device that compares a value monitored by the first monitor with a value monitored by the second monitor to determine one of a connection failure, at least at one of the first port, the second port, of the non-reciprocal device and a connection state of the dispersion compensator.

10 Claims, 17 Drawing Sheets

OPTICAL TRANSMISSION APPARATUS AND FAULT DETECTION METHOD

CROSS-REFERENCE TO RELATED APPLICATIONS

This application is based upon and claims the benefit of priority of the prior Japanese Patent Application No. 2009-145678 filed on Jun. 18, 2009, the entire contents of which are incorporated herein by reference.

FIELD

The embodiments discussed herein are related to an optical transmission apparatus transmitting an optical signal.

BACKGROUND

Wavelength Division Multiplexing (WDM) is currently in widespread use, in which multiple optical signals having different wavelengths are transmitted through one transmission line to increase the transmission capacity. In the WDM, the optical output power after the multiplexing of the optical signals is increased to a high level, for example, to about +20 dBm even if the optical output power per one wavelength is low, for example, is equal to a few dBm. Accordingly, it is necessary to take measures against the high optical output power.

For example, optical amplifier apparatuses used in optical communication systems include dispersion compensation devices that compensate dispersion characteristics occurring in the transmission lines. The optical amplifier apparatuses perform, for example, detection of connection failure in the dispersion compensation devices as the above measures.

FIG. 15 illustrates an example of the configuration of an optical communication system in related art. Referring to FIG. 15, the optical communication system includes optical amplifier apparatuses 10 and 20. The optical amplifier apparatus 10 is connected to the optical amplifier apparatus 20 via a transmission line 1. An optical signal amplified by the optical amplifier apparatus 10 is provided to the optical amplifier apparatus 20 through the transmission line 1. Since the optical amplifier apparatus 10 includes the same configuration as that of the optical amplifier apparatus 20, the configuration of the optical amplifier apparatus 20 will now be described.

The optical amplifier apparatus 20 includes couplers (CPLs) 21 and 22, a variable optical attenuator (VOA) 23, photodiodes (PDs) 24 and 25, a dispersion compensation device 26, and an optical amplifier module 27. Each of the CPLs 21 and 22 is a device that splits an optical signal.

The CPL 21 splits an optical signal provided from the optical amplifier apparatus 10 into signal components to provide one signal component to the PD 24 and provide the other signal component to the VOA 23. The CPL 22 splits an optical signal provided from the VOA 23 into signal components to provide one signal component to the PD 25 and provide the other signal component to the dispersion compensation device 26.

The VOA 23 is a device that attenuates an optical signal. The VOA 23 receives an optical signal from the CPL 21, attenuates the received optical signal, and provides the attenuated optical signal to the CPL 22.

The PD 24 is a device that receives an optical signal from the CPL 21 to convert the received optical signal into an electrical signal. The PD 24 provides the electrical signal to a monitor. The PD 25 is a device that receives an optical signal from the CPL 22 to convert the received optical signal into an electrical signal. The PD 25 provides the electrical signal to the monitor.

The dispersion compensation device 26 causes an appropriate delay for every wavelength in an optical signal that is received from the CPL 22 to compensate the dispersion existing in the optical signal. The dispersion compensation device 26 is connected to a To_DCF port and a From_DCF port.

The dispersion compensation device 26 receives an optical signal output from the CPL 22 through the To_DCF port to perform dispersion compensation to the received optical signal. The dispersion compensation device 26 provides the optical signal subjected to the dispersion compensation to the optical amplifier module 27 through the From_DCF port.

In order to simplify the optical communication system, to simplify the operation, and to decrease the number of menus in the dispersion compensation device, it is effective to use a dispersion compensation device including a directional device, such as a circulator as the dispersion compensation device 26. The dispersion compensation device including a directional device is, for example, a variable dispersion compensation device.

The optical amplifier module 27 is a device that receives an optical signal from the dispersion compensation device 26, amplifies the received optical signal, and outputs the amplified optical signal. The optical amplifier module 27 includes a PD. The optical amplifier module 27 converts the optical signal into an electrical signal with the PD and provides the resulting electrical signal to a monitor.

In detection of any fault in the dispersion compensation device 26, the optical amplifier apparatus 20 detects the difference between the electrical signal output from the PD 25 and the electrical signal output from the PD in the optical amplifier module 27. The optical amplifier apparatus 20 compares the detected difference with a given value to determine whether any connection failure occurs in the dispersion compensation device 26.

For example, if the optical amplifier apparatus 20 detects a connection failure, the optical amplifier apparatus 20 forcedly shuts down the optical amplifier module 27 to prevent an abnormal optical signal from being output from the optical amplifier module 27.

However, the above technology in the related art has a problem in that the optical amplifier apparatus cannot accurately detect a failure concerning the dispersion compensation device when the dispersion compensation device including a directional device is used. FIGS. 16 and 17 illustrate problems in the related art.

A problem in the related art will now be described with reference to FIG. 16. The dispersion compensation device 26 in FIG. 16 includes a circulator 26a and a device 26b performing the dispersion compensation. An optical signal received through a port (1) of the dispersion compensation device 26 is provided to the device 26b through the circulator 26a. An optical signal output from the device 26b is output from a port (2) through the circulator 26a.

With the fault detection method in the related art, since "the value of the monitor for the PD 25 is normal" and "the value of the monitor for the optical amplifier module 27 is abnormal" in a case in which a failure occurs in the device 26b and a case in which a failure, such as port disconnection, occurs in the To_DCF port or the From_DCF port, it is not possible to discriminate the above two cases.

Another problem in the related art will now be described with reference to FIG. 17. In the dispersion compensation device 26 illustrated in FIG. 17, the To_DCF port and the From_DCF port are connected in a manner opposite to that in the connection in FIG. 16 because of the circulator. In the connection in FIG. 17, an optical signal received through the port (2) is output from the port (1) not through the device 26b.

When the To_DCF port and the From_DCF port are connected in the opposite manner, it should be determined that a failure occurs because the optical signal does not pass through the device 26b and expected dispersion characteristics are not received. However, since the amount of optical loss is small when the optical signal does not pass through the device 26b, as in the case in FIG. 17, it is not possible to determine that the abnormal state occurs only from the value of the monitor for the PD 25 and the value of the monitor for the optical amplifier module 27 and, thus, the abnormal state cannot be detected.

SUMMARY

According to an aspect of the disclosed embodiments, an optical transmission apparatus includes a non-reciprocal device including first to second ports, an optical signal input from the first port being provided to the second port, an optical signal input from the second port being provided to the first port, a dispersion compensator that is coupled to the first port of the non-reciprocal device and that conducts given processing to an optical signal input from the first port of the non-reciprocal device to provide the optical signal subjected to the given processing to the second port of the non-reciprocal device, a first monitor configured to monitor an optical signal output from the first port, a second monitor configured to monitor an optical signal output from the second port, and a fault determination device that compares a value monitored by the first monitor with a value monitored by the second monitor to determine a connection failure at the first and/or second ports of the non-reciprocal device and/or a connection state of the dispersion compensator.

The object and advantages of the disclosed embodiments will be realized and attained by means of the elements and combinations particularly pointed out in the claims.

It is to be understood that both the foregoing general description and the following detailed description are exemplary and explanatory and are not restrictive of the disclosed embodiments, as claimed.

DESCRIPTION OF EMBODIMENTS

Embodiments of an optical transmission apparatus disclosed in the present invention will herein be described in detail with reference to the attached drawings. However, the present invention is not limited to the embodiments described below.

Figure 1:
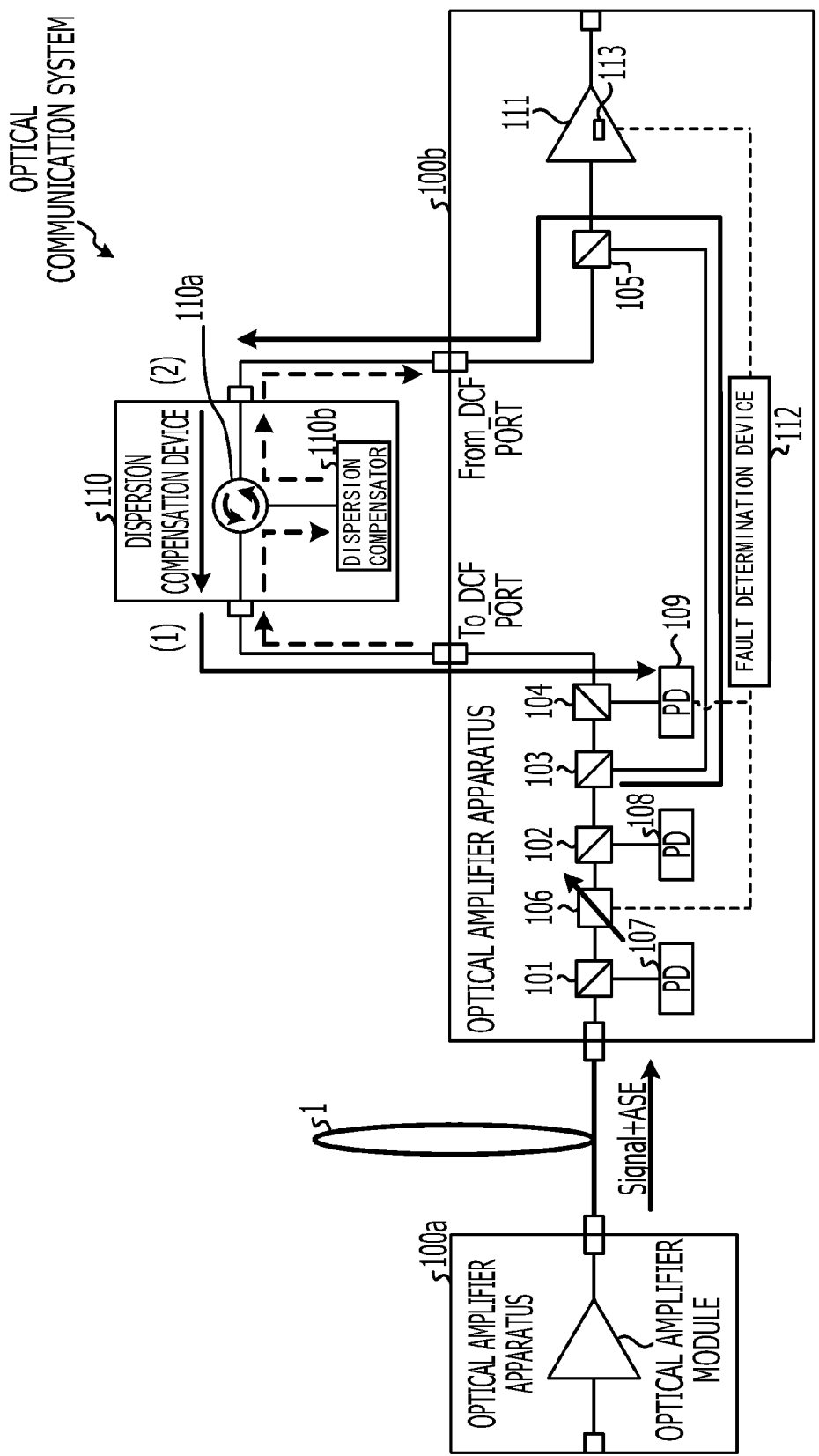
FIG. 1 illustrates an example of the configuration of an optical communication system according to a first embodiment of the present invention.

FIG. 1 illustrates an example of the configuration of an optical communication system according to a first embodiment of the present invention. Referring to FIG. 1, the optical communication system includes an optical amplifier apparatus 100a and an optical amplifier apparatus 100b. The optical amplifier apparatus 100a is connected to the optical amplifier apparatus 100b via a transmission line 1. Since the optical amplifier apparatus 100a includes the same configuration as that of the optical amplifier apparatus 100b, the configuration of the optical amplifier apparatus 100b will now be described.

The optical amplifier apparatus 100b includes couplers (CPLs) 101 to 105, a variable optical attenuator (VOA) 106, photodiodes (PDs) 107 to 109, a dispersion compensation device 110, an optical amplifier module 111, and a fault determination device 112.

The CPL 101 splits an optical signal provided from the optical amplifier apparatus 100a into signal components to provide one signal component to the PD 107 and provide the other signal component to the VOA 106. The CPL 102 splits an optical signal provided from the VOA 106 into signal components to provide one signal component to the PD 108 and provide the other signal component to the CPL 103.

The CPL 103 provides an optical signal from the CPL 102 to the CPL 104. The CPL 103 provides an optical signal from the CPL 104 to the CPL 105. The CPL 104 provides an optical signal from the CPL 103 to the dispersion compensation device 110 through a To_DCF port. The CPL 104 provides an optical signal provided from the dispersion compensation device 110 through the To_DCF port to the PD 109.

The CPL 105 provides an optical signal provided from the dispersion compensation device 110 through a From_DCF port to the optical amplifier module 111. The CPL 105 provides an optical signal from the CPL 103 to the dispersion compensation device 110 through the From_DCF port.

The VOA 106 is a device that attenuates an optical signal. The VOA 106 receives an optical signal from the CPL 101, attenuates the received optical signal, and provides the attenuated optical signal to the CPL 102. If a fault occurs in, for example, the dispersion compensation device 110, the VOA 106 increases the amount of attenuation to prevent a high-power optical signal from being provided to the dispersion compensation device 110.

The PD 107 is a device that receives an optical signal from the CPL 101 and converts the received optical signal into an electrical signal. The PD 107 provides the electrical signal to a monitor. The PD 108 is a device that receives an optical signal from the CPL 102 and converts the received optical signal into an electrical signal. The PD 108 provides the electrical signal to the monitor. The PD 109 is a device that receives an optical signal from the CPL 104 and converts the received optical signal into an electrical signal. The PD 109 provides the electrical signal to the fault determination device 112.

The dispersion compensation device 110 causes an appropriate delay for every wavelength in an optical signal that is received from the CPL 104 to compensate the dispersion existing in the optical signal. The dispersion compensation device 110 includes a circulator 110a and a device 110b performing the dispersion compensation.

The dispersion compensation device 110 is connected to the To_DCF port and the From_DCF port. A connection method in which a port (1) of the dispersion compensation device 110 is connected to the To_DCF port and a port (2) of the dispersion compensation device 110 is connected to the From_DCF port corresponds to normal connection.

An optical signal input from the port (1) of the dispersion compensation device 110 is input into the device 110b through the circulator 110a. The optical signal subjected to the dispersion compensation in the device 110b is output from the port (2) through the circulator 110a. In contrast, an optical signal input from the port (2) of the dispersion compensation device 110 is output from the port (1) not through the device 110b.

The optical amplifier module 111 is a device that receives an optical signal from CPL 105, amplifies the received optical signal, and outputs the amplified optical signal. The optical amplifier module 111 includes a PD 113. The optical amplifier module 111 converts the optical signal into an electrical signal with the PD 113 and provides the resulting electrical signal to the fault determination device 112.

The fault determination device 112 is a processor that determines any fault concerning the dispersion compensation device 110. The fault determination device 112 includes a first given value and a second given value. The fault determination device 112 compares the value of the electrical signal received from the PD 109 with the first given value and compares the value of the electrical signal received from the PD 113 in the optical amplifier module 111 with the second given value to determine any fault on the basis of the result of the comparison.

The value of the electrical signal received from the PD 109 is hereinafter referred to as a first monitor value, and the value of the electrical signal received from the PD 113 in the optical amplifier module 111 is hereinafter referred to as a second monitor value. A first threshold value indicates a value that is set so as to reflect the loss of the optical signal transmitted through the port (2) and the port (1), not through the device 110b in the dispersion compensation device 110. A second threshold value indicates a value that is set so as to reflect the loss of the optical signal transmitted through the port (1), the device 110b in the dispersion compensation device 110, and the port (2).

If the first monitor value is higher than or equal to the first given value and the second monitor value is higher than or equal to the second threshold value, the fault determination device 112 determines that the dispersion compensation device 110 is in a normal state and provides the result of the determination to, for example, the monitor.

If the first monitor value is higher than or equal to the first threshold value (the first monitor value is normal) and the second monitor value is lower than the second threshold value (the second monitor value is abnormal), the fault determination device 112 determines that the device 110b fails and provides the result of the determination to, for example, the monitor. If the first monitor value is higher than or equal to the first given value, no port connection failure occurs and the connection of the port is normal. If the second monitor value is lower than the second threshold value although no port connection failure occurs, the fault determination device 112 determines that any fault occurs in the device 110b and a loss is caused in the second monitor value.

If the first monitor value is lower than the first given value (the first monitor value is abnormal) and the second monitor value is lower than the second given value (the second monitor value is abnormal), the fault determination device 112 determines that a port connection failure occurs in the To_DCF port or the From_DCF port and provides the result of the determination to, for example, the monitor. When a port connection failure occurs, both of the path of the signal light provided from the CPL 104 to the dispersion compensation device 110 and the path of the signal light provided from the CPL 105 to the dispersion compensation device 110 are in a disconnection state. Accordingly, the first and second monitor values have a no input level.

Figure 2:
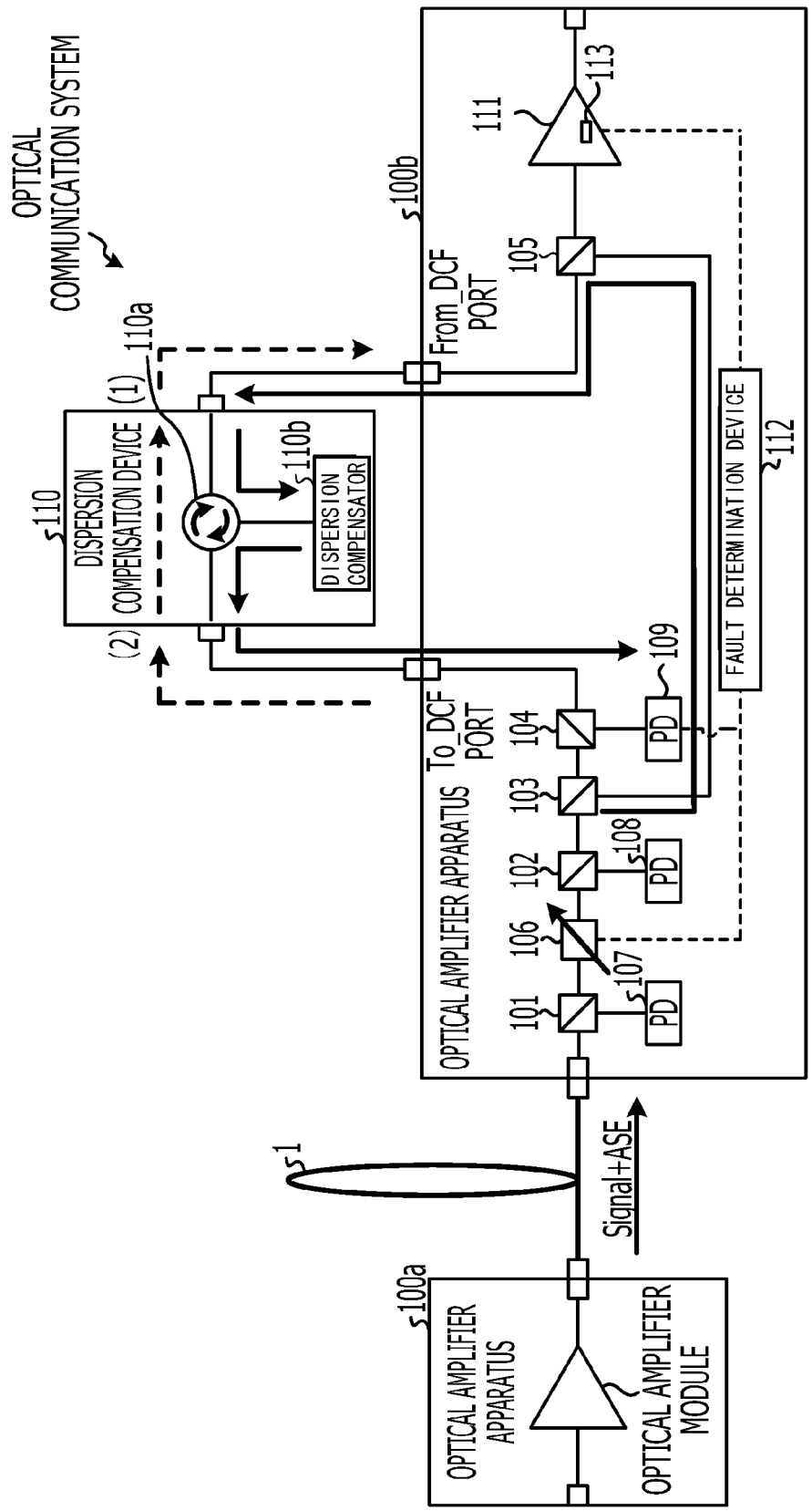
FIG. 2 illustrates a case in which a dispersion compensation device according to the first embodiment is wrongly connected.

A case will now be described in which the dispersion compensation device 110 according to the first embodiment is wrongly connected. FIG. 2 illustrates the case in which the dispersion compensation device 110 according to the first embodiment is wrongly connected. In the dispersion compensation device 110 in FIG. 2, the To_DCF port is connected to the port (2) and the From_DCF port is connected to the port (1).

When the dispersion compensation device 110 is wrongly connected in the manner illustrated in FIG. 2, the optical signal from the To_DCF port, which is normally subjected to the dispersion compensation, is input into the dispersion compensation device 110 and is output from the dispersion compensation device 110 not through the device 110b. Accordingly, the optical signal that is not subjected to the dispersion compensation is output and is provided to the optical amplifier module 111. In this case, since no device loss is reflected in the optical signal input into the optical amplifier module 111, the second monitor value is higher than or equal to the second given value.

In contrast, the optical signal from the From_DCF port, which is normally not subjected to the dispersion compensation, is input into the dispersion compensation device 110 and is output from the dispersion compensation device 110 through the device 110b. In this case, since an unexpected device loss is reflected in the optical signal input into the PD 109, the first monitor value is lower than the first given value.

Practically, if the first monitor value is lower than the first given value and the second monitor value is higher than or equal to the second given value, the fault determination device 112 determines that the dispersion compensation device is in the wrong connection state and provides the result of the determination to, for example, the monitor.

Upon detection of any of the failure of the device 110b, the port connection failure, and the wrong connection, the fault determination device 112 causes the VOA 106 to increase the loss in the VOA 106. Increasing the loss in the VOA 106 prevents the high-power optical signal from the To_DCF port from being provided to the dispersion compensation device 110. The fault determination device 112 may set off an alarm to notify an abnormal state if the fault determination device 112 detects the abnormal state.

Figure 3A:
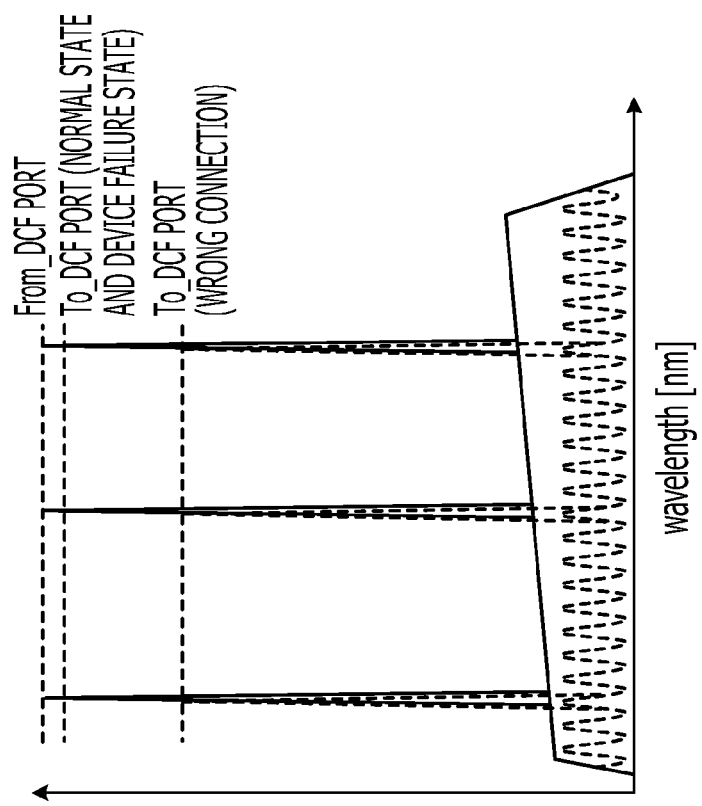
FIG. 3A illustrates optical spectra in states at a To_DCF port and a From_DCF port in the first embodiment.
Figure 3B:
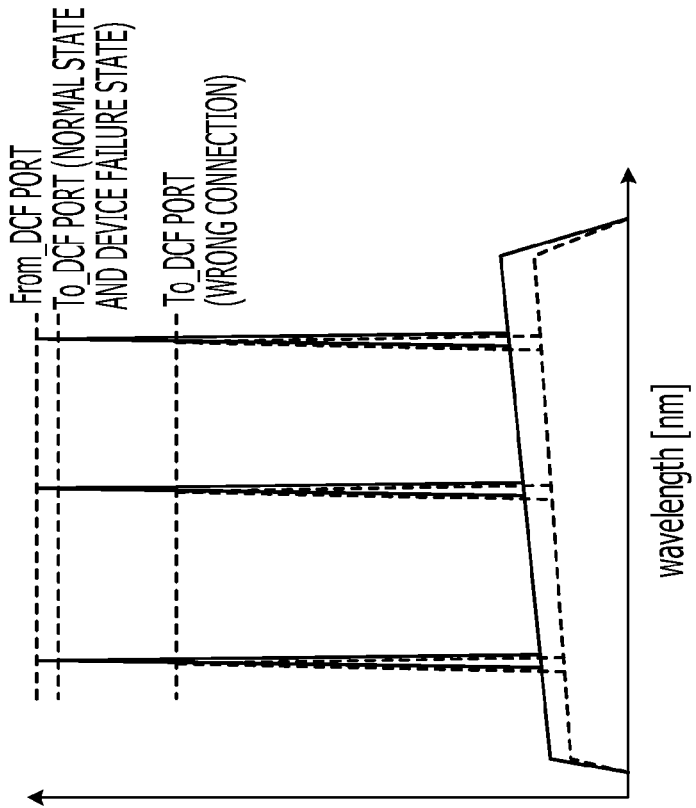
FIG. 3B illustrates optical spectra in the states at the To_DCF port and the From_DCF port in the first embodiment.

FIGS. 3A and 3B illustrate optical spectra in the normal state, in the state in which the device failure occurs, and in the state in which the port is wrongly connected at the To_DCF port and the From_DCF port in the first embodiment. FIG. 3A illustrates a case in which the device 110b has flat loss characteristics. FIG. 3B illustrates a case in which the device 110b has periodic loss characteristics.

As illustrated in FIGS. 3A and 3B, the monitor value (the integral value of the signal light and the amplified spontaneous emission (ASE) light) at the PD 109 when the device 110b has the flat loss characteristics differs from the monitor value at the PD 109 when the device 110b has the periodic loss characteristics in the following manner. The periodic loss characteristics include, for example, comb-shaped loss characteristics. The optical amplifier apparatus 100b illustrated in FIG. 1 can accurately detect any fault not only when the device having the flat loss characteristics is applied to the dispersion compensation device 110 but also when the device having the periodic loss characteristics is applied to the dispersion compensation device 110.

In the normal state, since only the loss in the circulator 110a is reflected in the signal light and the ASE light and the loss in the device is small, the spectrum that is approximately the same as that at the From_DCF port is achieved. The amount of attenuation is very low, for example, is equal to about 0.x dB. Refer to solid lines in FIGS. 3A and 3B.

In the state in which the device failure occurs, the same value as in the normal state is monitored at the PD 109. However, since the input into the optical amplifier module 111 is abnormal, the device failure state can be determined. Refer to the solid lines in FIGS. 3A and 3B.

In the state in which the port connection failure occurs, since the port disconnection is caused, the optical signal from the dispersion compensation device 110 has the no input level at the To_DCF port.

In the state in which the port is wrongly connected, the loss characteristics in the device are reflected in the signal light and the ASE light and the levels of the signal light and the ASE light are decreased. Since the loss in the device is much larger than the loss in the circulator 110a, the normal state, the device failure state, and the wrong connection of the port can be determined from the monitor value detected at the PD 109. Refer to broken lines in FIGS. 3A and 3B.

Figure 4:
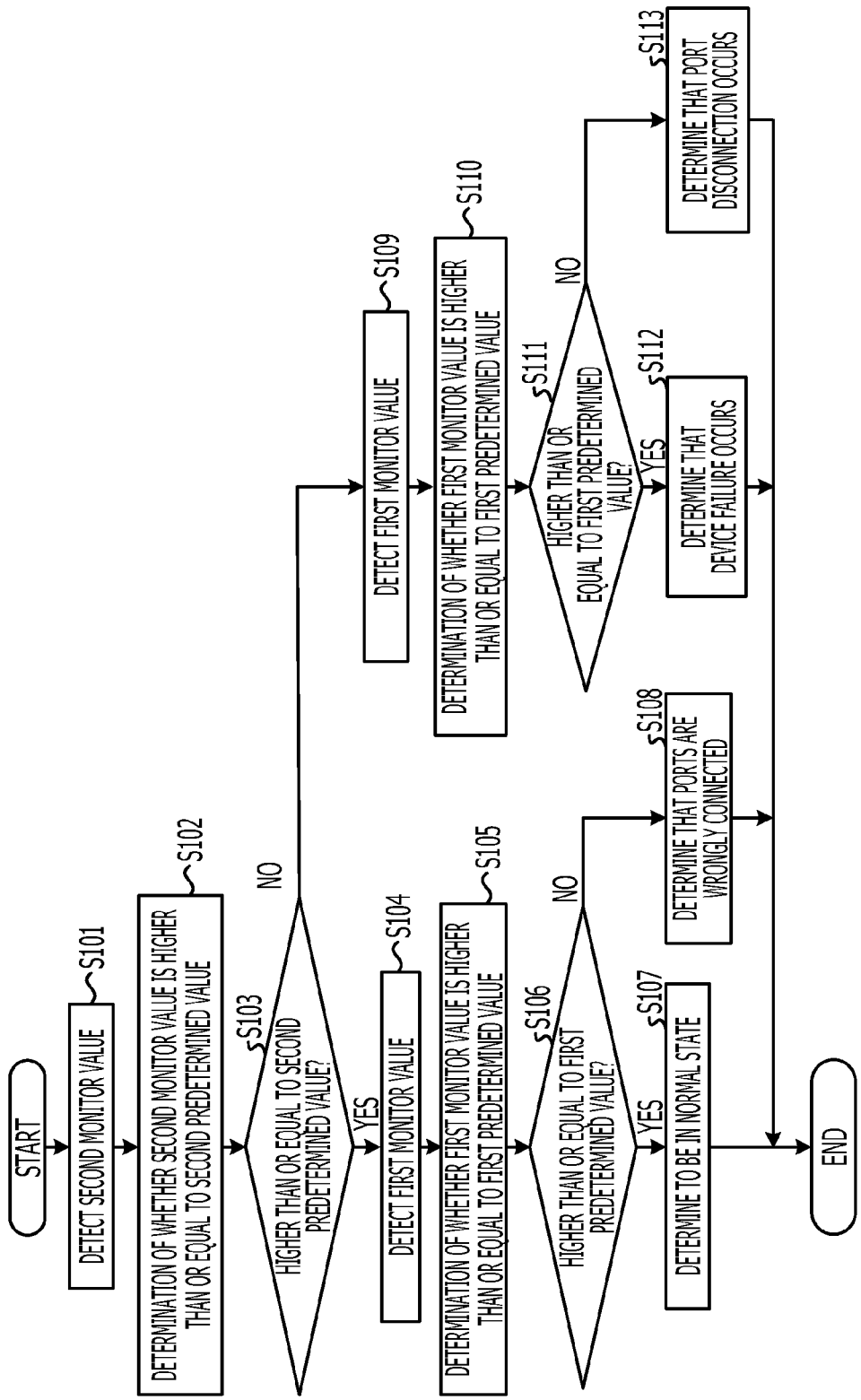
FIG. 4 illustrates an example of a processing process in an optical amplifier apparatus according to the first embodiment.

A processing process in the optical amplifier apparatus 100b according to the first embodiment will now be described. FIG. 4 illustrates an example of the processing process in the optical amplifier apparatus 100b according to the first embodiment. Referring to FIG. 4, in operation S101, the fault determination device 112 in the optical amplifier apparatus 100b detects the second monitor value from the optical amplifier module 111. In operation S102, the fault determination device 112 performs determination of whether the second monitor value is higher than or equal to the second given value.

If the second monitor value is higher than or equal to the second given value (Yes in operation S103), then in operation S104, the fault determination device 112 detects the first monitor value from the PD 109. In operation S105, the fault determination device 112 performs determination of whether the first monitor value is higher than or equal to the first given value.

If the first monitor value is higher than or equal to the first given value (Yes in operation S106), then in operation S107, the fault determination device 112 determines that the dispersion compensation device 110 is in the normal state. If the first monitor value is lower than the first given value (No in operation S106), then in operation S108, the fault determination device 112 determines that the port are in the wrong connection state.

If the second monitor value is lower than the second given value (No in operation S103), then in operation S109, the fault determination device 112 detects the first monitor value from the PD 109. In operation S110, the fault determination device 112 performs determination of whether the first monitor value is higher than or equal to the first given value.

If the first monitor value is higher than or equal to the first given value (Yes in operation S111), then in operation S112, the fault determination device 112 determines that the device failure occurs. If the first monitor value is lower than the first given value (No in operation S111), then in operation S113, the fault determination device 112 determines that the port disconnection is caused.

As described above, in the optical amplifier apparatus 100b according to the first embodiment, the fault determination device 112 receives the first monitor value from the PD 109 and receives the second monitor value from the optical amplifier module 111. Since the fault determination device 112 compares the first monitor value with the first given value and compares the second monitor value with the second given value to perform the fault determination on the basis of the results of the comparison, it is possible to accurately determine any fault in the dispersion compensation device. For example, it is possible to differentiate and determine the connection failure, the device failure, and the wrong connection in the dispersion compensation device including a directional device, such as the circulator 110a.

In addition, when the optical amplifier apparatus 100b is turned on, the fault determination device 112 performs the fault determination to provide the result of the determination to the monitor. Accordingly, it is possible to rapidly detect the abnormal connection state due to an operation error to avoid turning on the optical amplifier apparatus in the abnormal state.

Furthermore, the optical amplifier apparatus 100b according to the first embodiment can determine the abnormal state regardless of the loss characteristics of the device 110b, as described above with reference to FIGS. 3A and 3B.

Although the PD 113 in the optical amplifier module 111 is used to detect the second monitor value in the first embodiment, the detection of the second monitor value is not limited to the use of the PD 113. For example, a PD used to detect the second monitor value may be separately provided downstream of the dispersion compensation device 110.

Alternatively, an optical switch may be provided, instead of the CPL 103, to switch between the signal light and the optical signal so that the main signal light provided from the optical amplifier apparatus 100a does not interfere with the optical signal in the opposite direction provided from the dispersion compensation device 110.

Figure 5:
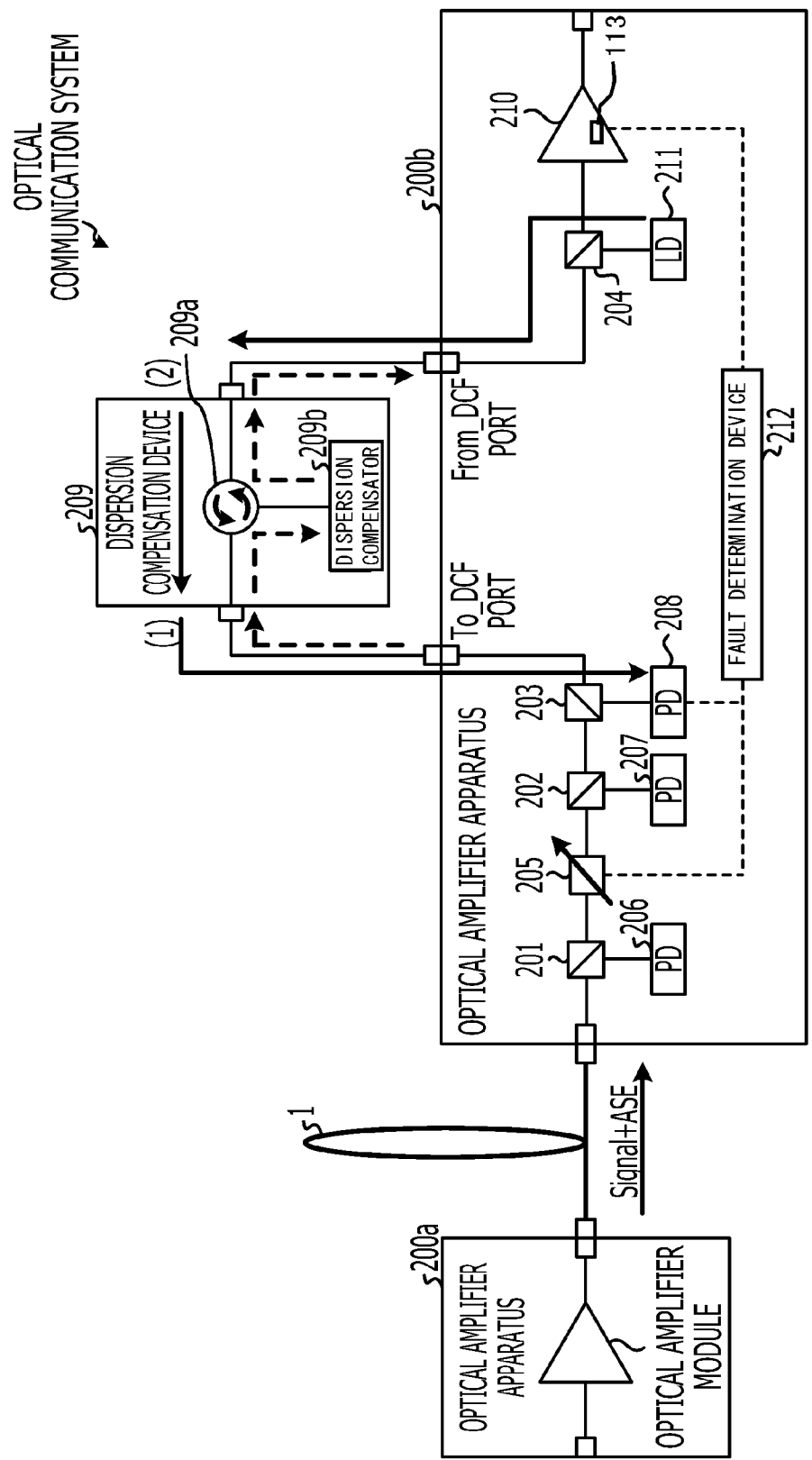
FIG. 5 illustrates an example of the configuration of an optical communication system according to a second embodiment of the present invention.

The configuration of an optical communication system according to a second embodiment of the present invention will now be described. FIG. 5 illustrates an example of the configuration of the optical communication system according to the second embodiment. Referring to FIG. 5, the optical communication system includes an optical amplifier apparatus 200a and an optical amplifier apparatus 200b. Since the optical amplifier apparatus 200a includes the same configuration as that of the optical amplifier apparatus 200b, the configuration of the optical amplifier apparatus 200b will now be described.

Referring to FIG. 5, the optical amplifier apparatus 200b includes CPLs 201 to 204, a VOA 205, PDs 206 to 208, a dispersion compensation device 209, an optical amplifier module 210, a laser diode (LD) 211, and a fault determination device 212.

The CPL 201 splits an optical signal provided from the optical amplifier apparatus 200a into signal components to provide one signal component to the PD 206 and provide the other signal component to the VOA 205. The CPL 202 splits an optical signal provided from the VOA 205 into signal components to provide one signal component to the PD 207 and provide the other signal component to the CPL 203.

The CPL 203 provides an optical signal from the CPL 202 to the dispersion compensation device 209. The CPL 203 provides an optical signal from the dispersion compensation device 209 to the PD 208.

The CPL 204 provides an optical signal from the dispersion compensation device 209 to the optical amplifier module 210. The CPL 204 provides an optical signal from the LD 211 to the dispersion compensation device 209.

The VOA 205 is a device that attenuates an optical signal. The VOA 205 receives an optical signal from the CPL 201, attenuates the received optical signal, and provides the attenuated optical signal to the CPL 202. If a fault occurs in, for example, the dispersion compensation device 209, the VOA 205 increases the amount of attenuation to prevent a high-power optical signal from being provided to the dispersion compensation device 209.

The PD 206 is a device that receives an optical signal from the CPL 201 and converts the received optical signal into an electrical signal. The PD 206 provides the electrical signal to a monitor. The PD 207 is a device that receives an optical signal from the CPL 202 and converts the received optical signal into an electrical signal. The PD 207 provides the electrical signal to the monitor.

The PD 208 is a device that receives an optical signal from the CPL 203 and converts the received optical signal into an electrical signal. The PD 208 provides the electrical signal to the fault determination device 212.

The dispersion compensation device 209 causes an appropriate delay for every wavelength in an optical signal that is received from the CPL 203 to compensate the dispersion existing in the optical signal. The dispersion compensation device 209 includes a circulator 209a and a device 209b performing the dispersion compensation.

The dispersion compensation device 209 is connected to a To_DCF port and a From_DCF port. A connection method in which a port (1) of the dispersion compensation device 209 is connected to the To_DCF port and a port (2) of the dispersion compensation device 209 is connected to the From_DCF port corresponds to the normal connection.

An optical signal input from the port (1) of the dispersion compensation device 209 is input into the device 209b through the circulator 209a. The optical signal subjected to the dispersion compensation in the device 209b is output from the port (2) through the circulator 209a. In contrast, an optical signal input from the port (2) of the dispersion compensation device 209 is output from the port (1) not through the device 209b.

The optical amplifier module 210 is a device that receives an optical signal from CPL 204, amplifies the received optical signal, and outputs the amplified optical signal. The optical amplifier module 210 includes a PD. The optical amplifier module 210 converts the optical signal into an electrical signal with the PD and provides the resulting electrical signal to the fault determination device 212.

The LD 211 is a device that provides an optical signal (LD light) to the dispersion compensation device 209 through the CPL 204. The LD 211 may provide an optical signal to the CPL 204 during a period in which the fault detection is performed to decrease the power consumption.

The fault determination device 212 is a processor that determines any fault concerning the dispersion compensation device 209. The fault determination device 212 includes a first given value and a second given value. The fault determination device 212 compares the value of the electrical signal received from the PD 208 with the first given value and compares the value of the electrical signal received from the PD in the optical amplifier module 210 with the second given value to determine any fault on the basis of the result of the comparison.

The value of the electrical signal received from the PD 208 is hereinafter referred to as a first monitor value, and the value of the electrical signal received from the PD in the optical amplifier module 210 is hereinafter referred to as a second monitor value. A first threshold value indicates a value that is set so as to reflect the loss of the optical signal transmitted through the port (2) and the port (1), not through the device 209b in the dispersion compensation device 209. A second threshold value indicates a value that is set so as to reflect the loss of the optical signal transmitted through the port (1), the device 209b in the dispersion compensation device 209, and the port (2).

If the first monitor value is higher than or equal to the first given value (the first monitor value is normal) and the second monitor value is higher than or equal to the second threshold value (the second monitor value is normal), the fault determination device 212 determines that the dispersion compensation device 209 is in the normal state and provides the result of the determination to, for example, the monitor.

If the first monitor value is higher than or equal to the first threshold value (the first monitor value is normal) and the second monitor value is lower than the second threshold value (the second monitor value is abnormal), the fault determination device 212 determines that the device 209b fails and provides the result of the determination to, for example, the monitor. If the first monitor value is higher than or equal to the first given value, no port connection failure occurs and the connection of the port is normal. If the second monitor value is lower than the second threshold value although no port connection failure occurs, the fault determination device 212 determines that any fault occurs in the device 209b and a loss is caused in the second monitor value.

If the first monitor value is lower than the first given value (the first monitor value is abnormal) and the second monitor value is lower than the second given value (the second monitor value is abnormal), the fault determination device 212 determines that a port connection failure occurs in the To_DCF port or the From_DCF port and provides the result of the determination to, for example, the monitor. When a port connection failure occurs, both of the path of the signal light provided from the CPL 203 to the dispersion compensation device 209 and the path of the signal light provided from the CPL 204 to the dispersion compensation device 209 are in the disconnection state. Accordingly, the first and second monitor values have the no input level.

Figure 6:
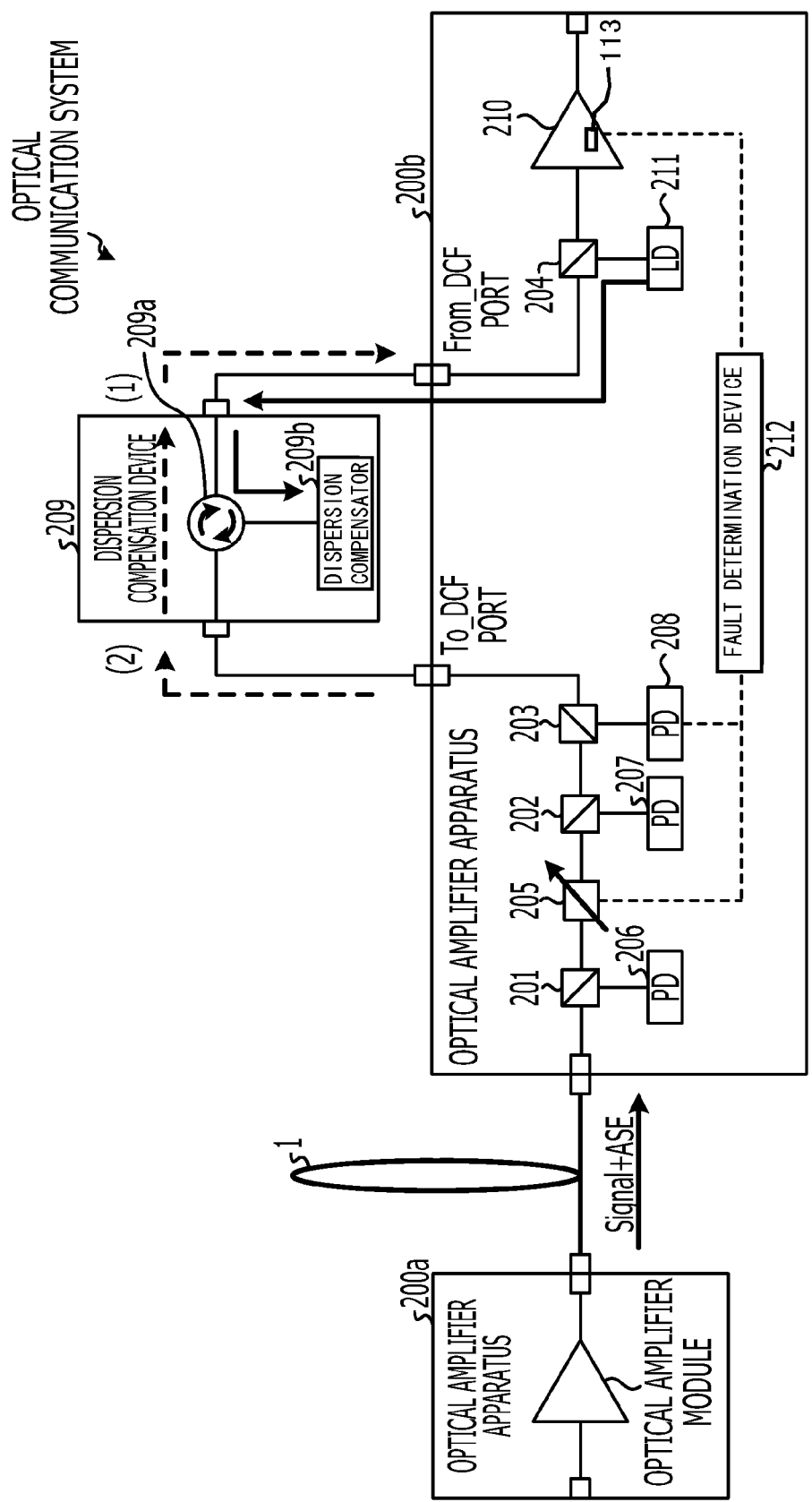
FIG. 6 illustrates a case in which a dispersion compensation device according to the second embodiment is wrongly connected.

A case will now be described in which the dispersion compensation device 209 according to the second embodiment is wrongly connected. FIG. 6 illustrates the case in which the dispersion compensation device 209 according to the second embodiment is wrongly connected. In the dispersion compensation device 209 in FIG. 6, the To_DCF port is connected to the port (2) and the From_DCF port is connected to the port (1).

When the dispersion compensation device 209 is wrongly connected in the manner illustrated in FIG. 6, the optical signal from the To_DCF port, which is normally subjected to the dispersion compensation, is input into the dispersion compensation device 209 and is output from the dispersion compensation device 209 not through the device 209b. Accordingly, the optical signal that is not subjected to the dispersion compensation is output and is provided to the optical amplifier module 210. In this case, since no device loss is reflected in the optical signal input into the optical amplifier module 210, the second monitor value is higher than or equal to the second given value.

In contrast, the optical signal from the From_DCF port, which is normally not subjected to the dispersion compensation, is input into the dispersion compensation device 209 and is output from the dispersion compensation device 209 through the device 209b. In this case, since an unexpected device loss is reflected in the optical signal input into the PD 208, the first monitor value is lower than the first given value.

Practically, if the first monitor value is lower than the first given value (the first monitor value is abnormal) and the second monitor value is higher than or equal to the second given value (the second monitor value is normal), the fault determination device 212 determines that the dispersion compensation device is in the wrong connection state and provides the result of the determination to, for example, the monitor.

Upon detection of any of the failure of the device 209b, the port connection failure, and the wrong connection, the fault determination device 212 causes the VOA 205 to increase the loss in the VOA 205. Increasing the loss in the VOA 205 prevents the high-power optical signal from the To_DCF port from being provided to the dispersion compensation device 209.

Figure 7:
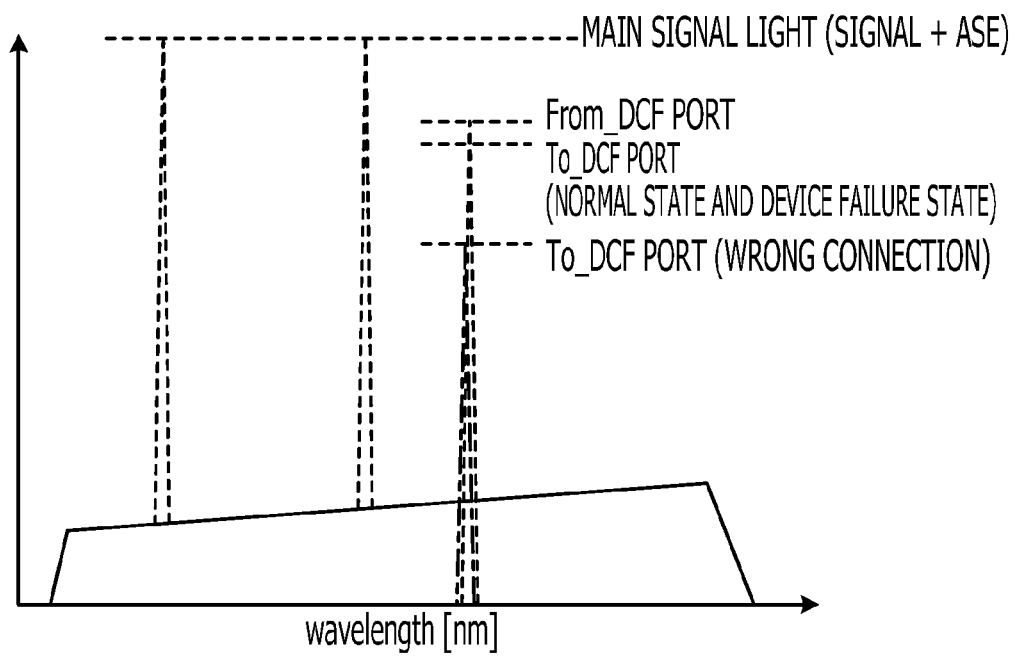
FIG. 7 illustrates optical spectra in states at a To_DCF port and a From_DCF port in the second embodiment.
Figure 8B:
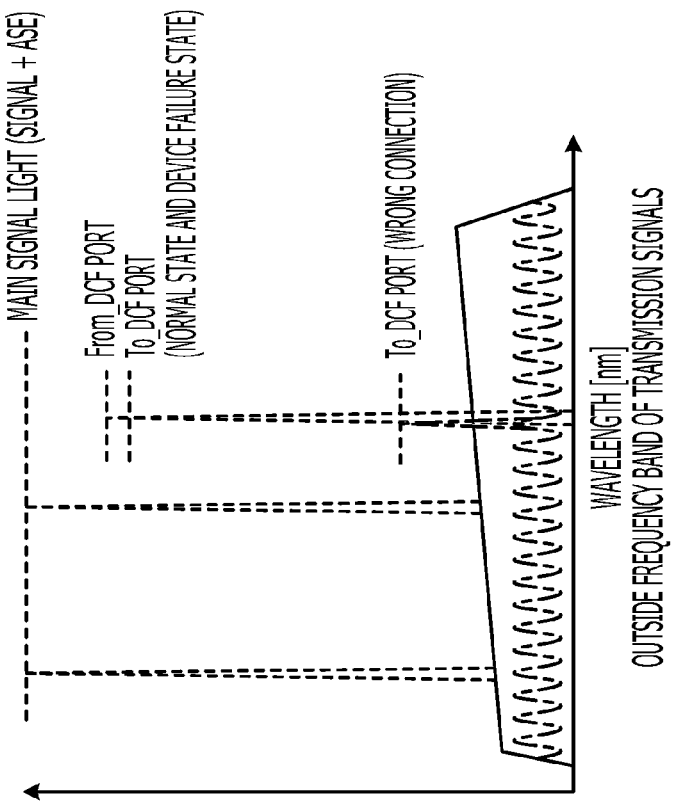
FIG. 8B illustrates optical spectra in the states at the To_DCF port and the From_DCF port in the second embodiment.
Figure 8A:
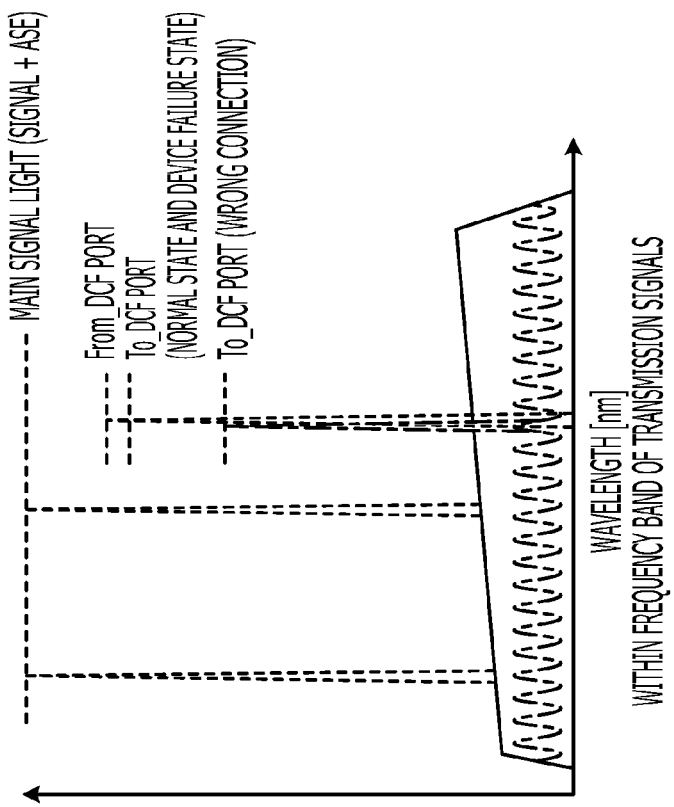
FIG. 8A illustrates optical spectra in the states at the To_DCF port and the From_DCF port in the second embodiment.

FIG. 7 and FIGS. 8A and 8B illustrate optical spectra in the normal state, in the state in which the device failure occurs, and in the state in which the port is wrongly connected at the To_DCF port and the From_DCF port in the second embodiment. FIG. 7 illustrates a case in which the device has flat loss characteristics. FIGS. 8A and 8B illustrate cases in which the device has periodic loss characteristics.

The monitor value when the device has the flat loss characteristics will now be described with reference to FIG. 7. In the normal state, since only the loss in the circulator 209a is reflected in the optical signal (LD light) output from the LD 211 and the loss in the device is small, the spectrum that is approximately the same as that at the From_DCF port is achieved. The amount of attenuation is very low, for example, is equal to about 0.x dB. Refer to broken lines in FIG. 7.

In the state in which the device failure occurs, the same value as in the normal state is monitored at the PD 208. However, since the input into the optical amplifier module 210 is abnormal, the device failure state can be determined. Refer to the broken line in FIG. 7.

In the state in which the port connection failure occurs, since the port disconnection is caused, the LD light at the To_DCF port has the no input level.

In the state in which the port is wrongly connected, the loss characteristics in the device are reflected in the LD light and the level of the LD light is decreased. Since the loss in the device is much larger than the loss in the circulator 209a, the normal state, the device failure state, and the wrong connection of the port can be determined from the monitor value detected at the PD 208. Refer to the broken lines in FIG. 7.

The monitor value when the device has the periodic loss characteristics will now be described with reference to FIGS. 8A and 8B. Since the device has the periodic loss characteristics in the case in FIGS. 8A and 8B, the LD light within the frequency band of transmission signals and the LD light outside the frequency band of the transmission signals are separately illustrated. FIG. 8A illustrates the monitor value when the LD light is within the frequency band of the transmission signals and FIG. 8B illustrates the monitor value when the LD light is outside the frequency band of the transmission signals.

When the LD light within the frequency band in which the signals having the periodic loss characteristics are transmitted is selected in the state in which the port is wrongly connected, the device loss is reflected in the LD light monitored at the PD 208 to decrease the level of the LD light. Refer to alternate long and short lines in FIG. 8A.

When the LD light outside the frequency band in which the signals having the periodic loss characteristics are transmitted is selected in the state in which the port is wrongly connected, the LD light is greatly attenuated in the device and the monitor value near the no input level is detected at the PD 208. The loss in the device is much larger than the loss in the circulator 209a both within the frequency band in which the signals having the periodic loss characteristics are transmitted and outside the frequency band in which the signals having the periodic loss characteristics are transmitted, so that the normal state, the device failure state, and the wrong connection of the port can be determined from the monitor value detected at the PD 208.

The optical amplifier apparatus 200b according to the second embodiment can accurately detect any fault not only when the device having the flat loss characteristics is applied to the dispersion compensation device 209 but also when the device having the periodic loss characteristics is applied to the dispersion compensation device 209, as in the optical amplifier apparatus according to the first embodiment. In addition, the LD light output from the LD 211 can be used to accurately detect any fault, regardless of whether the LD light is within the frequency band of the transmission signals or outside the frequency band thereof. For example, it is possible to differentiate and determine the connection failure, the device failure, and the wrong connection in the dispersion compensation device including a directional device, such as the circulator 209a.

Figure 9:
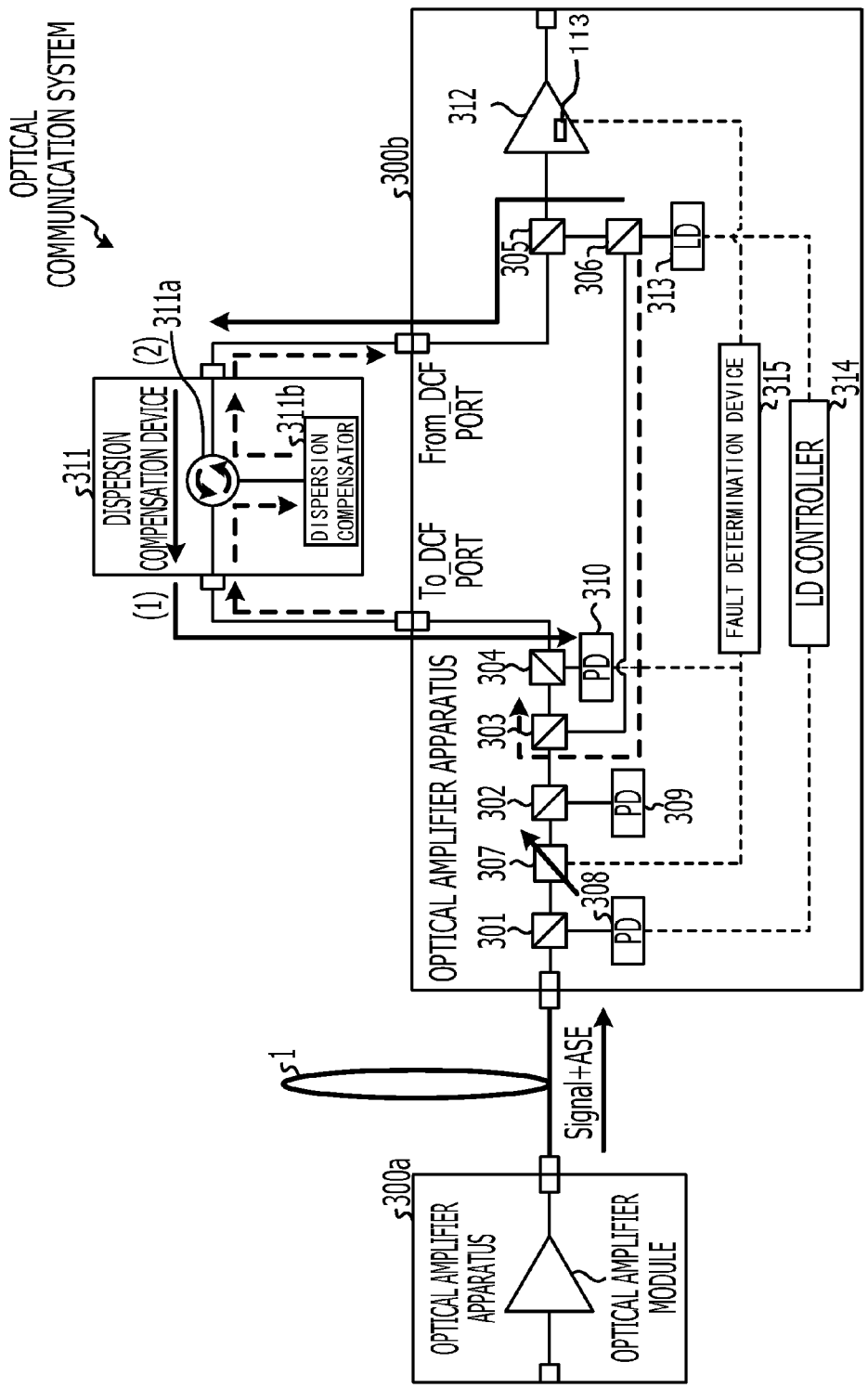
FIG. 9 illustrates an example of the configuration of an optical communication system according to a third embodiment of the present invention.

The configuration of an optical communication system according to a third embodiment of the present invention will now be described. FIG. 9 illustrates an example of the configuration of the optical communication system according to the third embodiment. Referring to FIG. 9, the optical communication system includes an optical amplifier apparatus 300a and an optical amplifier apparatus 300b. Since the optical amplifier apparatus 300a includes the same configuration as that of the optical amplifier apparatus 300b, the configuration of the optical amplifier apparatus 300b will now be described.

The optical amplifier apparatus 300b receives LD light (optical signals) from an LD 313 through a To_DCF port and a From_DCF port and detects the monitor values of the LD light with a PD 310 and an optical amplifier module 312 to allow detection of an abnormal state even without a main signal from the optical amplifier apparatus 300a.

Referring to FIG. 9, the optical amplifier apparatus 300b includes CPLs 301 to 306, a VOA 307, PDs 308 to 310, a dispersion compensation device 311, the optical amplifier module 312, the LD 313, an LD controller 314, and a fault determination device 315.

The CPL 301 splits an optical signal provided from the optical amplifier apparatus 300a into signal components to provide one signal component to the PD 308 and provide the other signal component to the VOA 307. The CPL 302 splits an optical signal provided from the VOA 307 into signal components to provide one signal component to the PD 309 and provide the other signal component to the CPL 303.

The CPL 303 provides an optical signal from the CPL 302 or an optical signal (LD light) from the CPL 306 to the CPL 304. The CPL 304 provides an optical signal from the CPL 303 to the dispersion compensation device 311. The CPL 304 provides an optical signal from the dispersion compensation device 311 to the PD 310.

The CPL 305 provides an optical signal from the dispersion compensation device 311 to the optical amplifier module 312. The CPL 305 provides an optical signal from the CPL 306 to the dispersion compensation device 311.

The CPL 306 splits an optical signal (LD light) from the LD 313 into signal components to provide one signal component to the CPL 303 and provide the other signal component to the CPL 305.

The VOA 307 is a device that attenuates an optical signal. The VOA 307 receives an optical signal from the CPL 301, attenuates the received optical signal, and provides the attenuated optical signal to the CPL 302. If a fault occurs in, for example, the dispersion compensation device 311, the VOA 307 increases the amount of attenuation to prevent a high-power optical signal from being provided to the dispersion compensation device 311.

The PD 308 is a device that receives an optical signal from the CPL 301 and converts the received optical signal into an electrical signal. The PD 308 provides the electrical signal to a monitor and the LD controller 314. The PD 309 is a device that receives an optical signal from the CPL 302 and converts the received optical signal into an electrical signal. The PD 309 provides the electrical signal to the monitor.

The PD 310 is a device that receives an optical signal from the CPL 304 and converts the received optical signal into an electrical signal. The PD 310 provides the electrical signal to the fault determination device 315.

The dispersion compensation device 311 causes an appropriate delay for every wavelength in an optical signal that is received from the CPL 304 to compensate the dispersion existing in the optical signal. The dispersion compensation device 311 includes a circulator 311a and a device 311b performing the dispersion compensation.

The dispersion compensation device 311 is connected to the To_DCF port and the From_DCF port. A connection method in which a port (1) of the dispersion compensation device 311 is connected to the To_DCF port and a port (2) of the dispersion compensation device 311 is connected to the From_DCF port corresponds to the normal connection.

An optical signal input from the port (1) of the dispersion compensation device 311 is input into the device 311b through the circulator 311a. The optical signal subjected to the dispersion compensation in the device 311b is output from the port (2) through the circulator 311a. In contrast, an optical signal input from the port (2) of the dispersion compensation device 311 is output from the port (1) not through the device 311b.

The optical amplifier module 312 is a device that receives an optical signal from the CPL 305, amplifies the received optical signal, and outputs the amplified optical signal. The optical amplifier module 312 includes a PD. The optical amplifier module 312 converts the optical signal into an electrical signal with the PD and provides the resulting electrical signal to the fault determination device 315.

The LD 313 is a device that provides optical signals (LD light) to the dispersion compensation device 311 through the corresponding CPLs and through the To_DCF port and the From_DCF port.

The LD controller 314 is a processor that receives an electrical signal from the PD 308, determines whether an optical signal and ASE light are input into the optical amplifier apparatus 300b, and controls the output from the LD 313 on the basis of the result of the determination.

If the LD controller 314 receives an electrical signal from the PD 308, the LD controller 314 determines that an optical signal and ASE light are input into the optical amplifier apparatus 300b and shuts down the LD 313. In contrast, if the LD controller 314 does not receive an electrical signal from the PD 308, the LD controller 314 determines that no optical signal and no ASE light are input into the optical amplifier apparatus 300b and causes the LD 313 to output an optical signal (LD light).

The fault determination device 315 is a processor that determines any fault concerning the dispersion compensation device 311. The fault determination device 315 includes a first given value and a second given value. The fault determination device 315 compares the value of the electrical signal received from the PD 310 with the first given value and compares the value of the electrical signal received from the PD in the optical amplifier module 312 with the second given value to determine any fault on the basis of the result of the comparison.

The value of the electrical signal received from the PD 310 is hereinafter referred to as a first monitor value, and the value of the electrical signal received from the PD in the optical amplifier module 312 is hereinafter referred to as a second monitor value. A first threshold value indicates a value that is set so as to reflect the loss of the optical signal transmitted through the port (2) and the port (1), not through the device 311b in the dispersion compensation device 311. A second threshold value indicates a value that is set so as to reflect the loss of the optical signal transmitted through the port (1), the device 311b in the dispersion compensation device 311, and the port (2).

If the first monitor value is higher than or equal to the first given value (the first monitor value is normal) and the second monitor value is higher than or equal to the second threshold value (the second monitor value is normal), the fault determination device 315 determines that the dispersion compensation device 311 is in the normal state and provides the result of the determination to, for example, the monitor.

If the first monitor value is higher than or equal to the first threshold value (the first monitor value is normal) and the second monitor value is lower than the second threshold value (the second monitor value is abnormal), the fault determination device 315 determines that the device 311b fails and provides the result of the determination to, for example, the monitor. If the first monitor value is higher than or equal to the first given value, no port connection failure occurs and the connection of the port is normal. If the second monitor value is lower than the second threshold value although no port connection failure occurs, the fault determination device 315 determines that any fault occurs in the device 311b and a loss is caused in the second monitor value.

If the first monitor value is lower than the first given value (the first monitor value is abnormal) and the second monitor value is lower than the second given value (the second monitor value is abnormal), the fault determination device 315 determines that a port connection failure occurs in the To_DCF port or the From_DCF port and provides the result of the determination to, for example, the monitor. When a port connection failure occurs, both of the path of the signal light provided from the CPL 304 to the dispersion compensation device 311 and the path of the signal light provided from the CPL 305 to the dispersion compensation device 311 are in the disconnection state. Accordingly, the first and second monitor values have the no input level.

If the first monitor value is lower than the first given value (the first monitor value is abnormal) and the second monitor value is higher than or equal to the second given value (the second monitor value is normal), the fault determination device 315 determines that the dispersion compensation device 311 is in the wrong connection state and provides the result of the determination to, for example, the monitor.

Upon detection of any of the failure of the device 311b, the port connection failure, and the wrong connection, the fault determination device 315 causes the VOA 307 to increase the loss in the VOA 307. Increasing the loss in the VOA 307 prevents the high-power optical signal from the To_DCF port from being provided to the dispersion compensation device 311.

Figure 10:
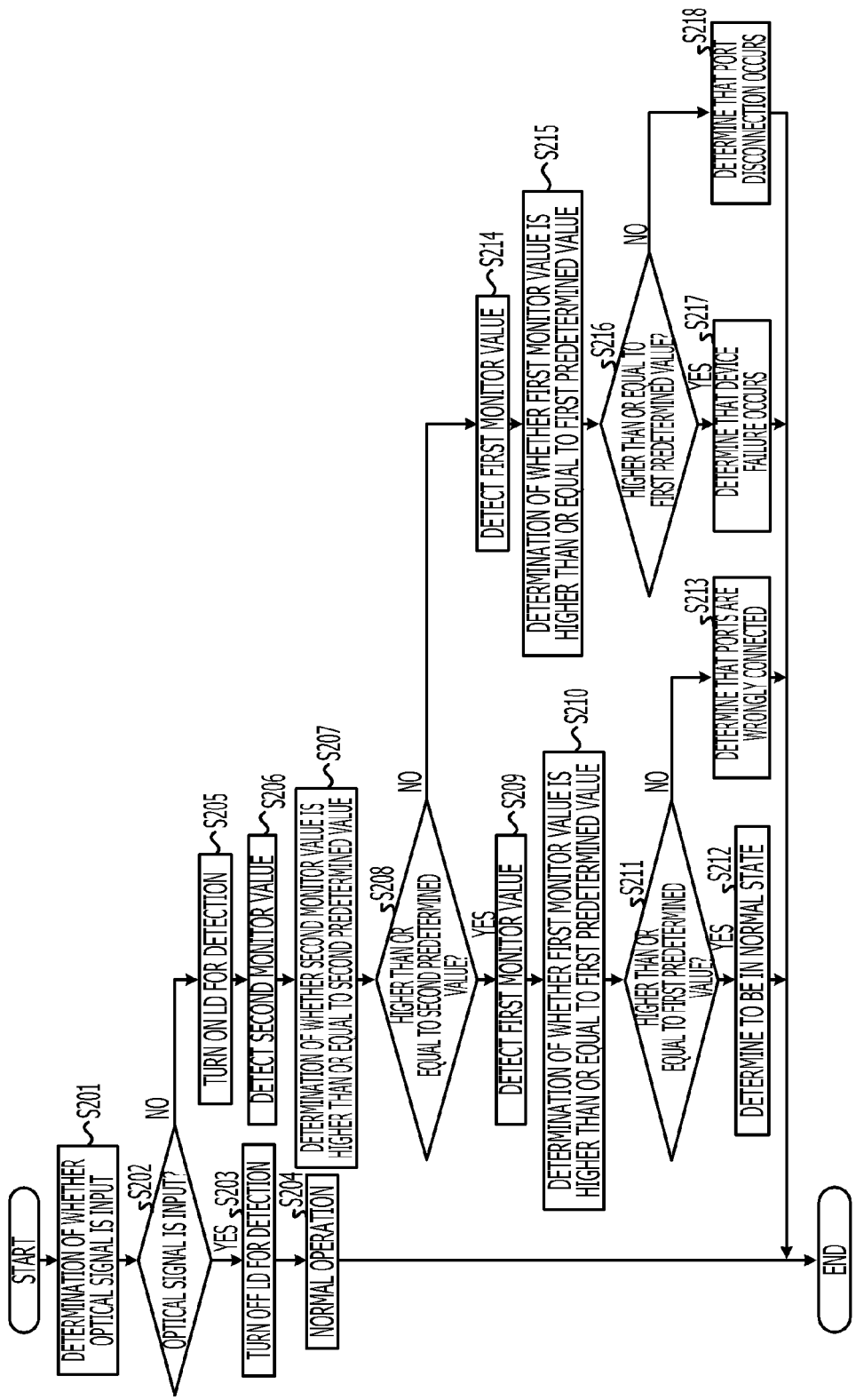
FIG. 10 illustrates an example of a processing process in an optical amplifier apparatus according to the third embodiment.

A processing process in the optical amplifier apparatus 300b according to the third embodiment will now be described. FIG. 10 illustrates an example of the processing process in the optical amplifier apparatus 300b according to the third embodiment. Referring to FIG. 10, in operation S201, the LD controller 314 in the optical amplifier apparatus 300b receives an electrical signal from the PD 308 to perform determination of whether an optical signal is input into the optical amplifier apparatus 300b.

If an optical signal is input into the optical amplifier apparatus 300b (Yes in operation S202), then in operation S203, the LD controller 314 turns off the LD 313 for detection. In operation S204, the dispersion compensation device 311 is normally operated.

If an optical signal is not input into the optical amplifier apparatus 300b (No in operation S202), then in operation S205, the LD controller 314 turns on the LD 313 for detection. In operation S206, the fault determination device 315 detects the second monitor value from the optical amplifier module 312.

In operation S207, the fault determination device 315 performs determination of whether the second monitor value is higher than or equal to the second given value. If the second monitor value is higher than or equal to the second given value (Yes in operation S208), then in operation in S209, the fault determination device 315 detects the first monitor value from the PD 310. In operation S210, the fault determination device 315 performs determination of whether the first monitor value is higher than or equal to the first given value.

If the first monitor value is higher than or equal to the first given value (Yes in operation S211), then in operation S212, the fault determination device 315 determines that the dispersion compensation device 311 is in the normal state. If the first monitor value is lower than the first given value (No in operation S211), then in operation S213, the fault determination device 315 determines that the port are in the wrong connection state.

If the second monitor value is lower than the second given value (No in operation S208), then in operation S214, the fault determination device 315 detects the first monitor value from the PD 310. In operation S215, the fault determination device 315 performs determination of whether the first monitor value is higher than or equal to the first given value.

If the first monitor value is higher than or equal to the first given value (Yes in operation S216), then in operation S217, the fault determination device 315 determines that the device failure occurs. If the first monitor value is lower than the first given value (No in operation S216), then in operation S218, the fault determination device 315 determines that the port disconnection is caused.

As described above, the optical amplifier apparatus 300b according to the third embodiment receives LD light (optical signals) from the LD 313 through the To_DCF port and the From_DCF port and detects the monitor values of the LD light with the PD 310 and the optical amplifier module 312 to allow detection of the abnormal state even without a main signal from the optical amplifier apparatus 300a.

In addition, the LD controller 314 determines that the optical signal and the ASE light are received and shuts down the LD 313 if an electrical signal is received from the PD 308, so that the power consumption can be minimized.

When the dispersion compensation device 311 has flat loss characteristics, the LD 313 adjusts the wavelength of the LD light so as to be within the frequency band of the optical signal provided from the optical amplifier apparatus 300a and outputs the adjusted LD light.

When the dispersion compensation device 311 has periodic loss characteristics, the LD 313 adjusts the wavelength of the LD light so that the LD light is transmitted through the dispersion compensation device 311. This is because, if the LD light is provided to the dispersion compensation device 311 without the adjustment of the wavelength, a considerable loss can possibly occur in the device 311b even in the normal state and the second monitor value may not be higher than or equal to the second given value.

Figure 11:
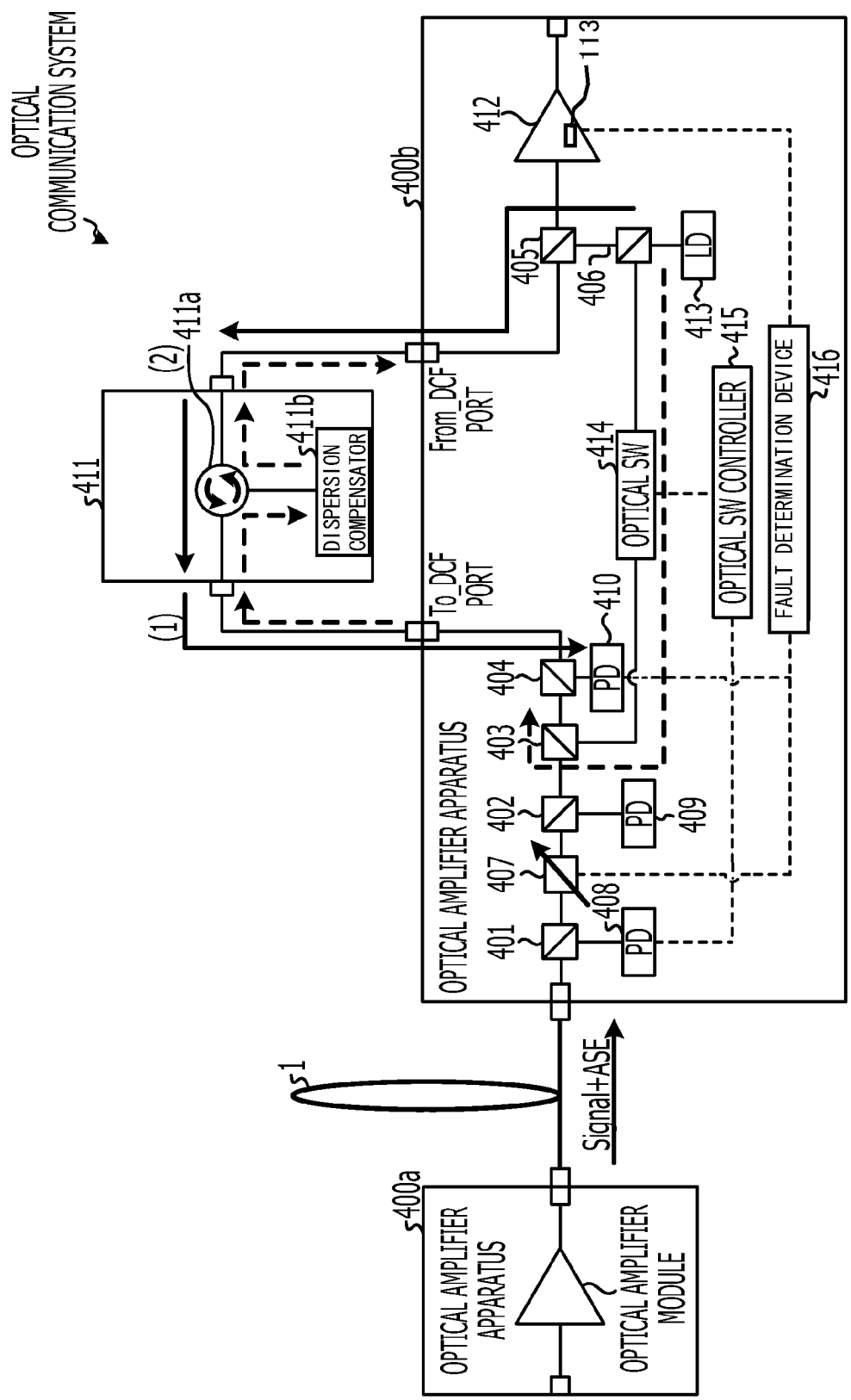
FIG. 11 illustrates an example of the configuration of an optical communication system according to a fourth embodiment of the present invention.

The configuration of an optical communication system according to a fourth embodiment of the present invention will now be described. FIG. 11 illustrates an example of the configuration of the optical communication system according to the fourth embodiment. Referring to FIG. 11, the optical communication system includes an optical amplifier apparatus 400a and an optical amplifier apparatus 400b. Since the optical amplifier apparatus 400a includes the same configuration as that of the optical amplifier apparatus 400b, the configuration of the optical amplifier apparatus 400b will now be described.

When the optical amplifier apparatus 400b receives no optical signal from the optical amplifier apparatus 400a, an optical signal from an LD 413 is received through a To_DCF port and a From_DCF port to perform fault determination. In contrast, when the optical amplifier apparatus 400b receives an optical signal from the optical amplifier apparatus 400a, the optical signal provided through the To_DCF port, among the optical signals output from the LD 413, is blocked by an optical switch (SW) 414 and the optical signal received from the optical amplifier apparatus 400a is output through the To_DCF port to perform the fault determination.

The optical SW 414 blocks the LD light from the LD 413 on the basis of whether an optical signal is received from the optical amplifier apparatus 400a in the optical amplifier apparatus 400b, so that the abnormal state can be detected regardless of whether an optical signal is received from the optical amplifier apparatus 400a.

Referring to FIG. 11, the optical amplifier apparatus 400b includes CPLs 401 to 406, a VOA 407, PDs 408 to 410, a dispersion compensation device 411, an optical amplifier module 412, and the LD 413. The optical amplifier apparatus 400b also includes the optical SW 414, an optical SW controller 415, and a fault determination device 416.

The CPL 401 splits an optical signal provided from the optical amplifier apparatus 400a into signal components to provide one signal component to the PD 408 and provide the other signal component to the VOA 407. The CPL 402 splits an optical signal provided from the VOA 407 into signal components to provide one signal component to the PD 409 and provide the other signal component to the CPL 403.

The CPL 403 provides an optical signal from the CPL 402 or an optical signal (LD light) from the CPL 406 to the CPL 404. The CPL 404 provides an optical signal from the CPL 403 to the dispersion compensation device 411. The CPL 404 provides an optical signal from the dispersion compensation device 411 to the PD 410.

The CPL 405 provides an optical signal from the dispersion compensation device 411 to the optical amplifier module 412. The CPL 405 provides an optical signal from the CPL 406 to the dispersion compensation device 411. The CPL 406 splits an optical signal (LD light) provided from the LD 413 into signal components to provide one signal component to the CPL 403 through the optical SW 414 and provide the other signal component to the CPL 405.

The VOA 407 is a device that attenuates an optical signal. The VOA 407 receives an optical signal from the CPL 401, attenuates the received optical signal, and provides the attenuated optical signal to the CPL 402. If a fault occurs in, for example, the dispersion compensation device 411, the VOA 407 increases the amount of attenuation to prevent a high-power optical signal from being provided to the dispersion compensation device 411.

The PD 408 is a device that receives an optical signal from the CPL 401 and converts the received optical signal into an electrical signal. The PD 408 provides the electrical signal to a monitor and the optical SW controller 415. The PD 409 is a device that receives an optical signal from the CPL 402 and converts the received optical signal into an electrical signal. The PD 409 provides the electrical signal to the monitor.

The PD 410 is a device that receives an optical signal from the CPL 404 and converts the received optical signal into an electrical signal. The PD 410 provides the electrical signal to the fault determination device 416.

The dispersion compensation device 411 causes an appropriate delay for every wavelength in an optical signal that is received from the CPL 404 to compensate the dispersion existing in the optical signal. The dispersion compensation device 411 includes a circulator 411a and a device 411b performing the dispersion compensation.

The dispersion compensation device 411 is connected to the To_DCF port and the From_DCF port. A connection method in which a port (1) of the dispersion compensation device 411 is connected to the To_DCF port and a port (2) of the dispersion compensation device 411 is connected to the From_DCF port corresponds to the normal connection.

An optical signal input from the port (1) of the dispersion compensation device 411 is input into the device 411b through the circulator 411a. The optical signal subjected to the dispersion compensation in the device 411b is output from the port (2) through the circulator 411a. In contrast, an optical signal input from the port (2) of the dispersion compensation device 411 is output from the port (1) not through the device 411b.

The optical amplifier module 412 is a device that receives an optical signal from the CPL 405, amplifies the received optical signal, and outputs the amplified optical signal. The optical amplifier module 412 includes a PD. The optical amplifier module 412 converts the optical signal into an electrical signal with the PD and provides the resulting electrical signal to the fault determination device 416.

The LD 413 is a device that provides optical signals (LD light) to the dispersion compensation device 411 through the corresponding CPLs and through the To_DCF port and the From_DCF port. The optical SW 414 blocks the transmission of an optical signal from the LD 413 on the basis of a control instruction from the optical SW controller 415.

The optical SW controller 415 is a processor that controls the optical SW 414 on the basis of an electrical signal from the PD 408. If the optical SW controller 415 receives an electrical signal from the PD 408, the optical SW controller 415 provides a control instruction to block the transmission of an optical signal to the optical SW 414. In contrast, if the optical SW controller 415 does not receive an electrical signal from the PD 408, the optical SW controller 415 provides a control instruction to permit the transmission of an optical signal to the optical SW 414.

The fault determination device 416 is a processor that determines any fault concerning the dispersion compensation device 411. The fault determination device 416 includes a first given value and a second given value. The fault determination device 416 compares the value of the electrical signal received from the PD 410 with the first given value and compares the value of the electrical signal received from the PD in the optical amplifier module 412 with the second given value to determine any fault on the basis of the result of the comparison.

The value of the electrical signal received from the PD 410 is hereinafter referred to as a first monitor value, and the value of the electrical signal received from the PD in the optical amplifier module 412 is hereinafter referred to as a second monitor value. A first threshold value indicates a value that is set so as to reflect the loss of the optical signal transmitted through the port (2) and the port (1), not through the device 411b in the dispersion compensation device 411. A second threshold value indicates a value that is set so as to reflect the loss of the optical signal transmitted through the port (1), the device 411b in the dispersion compensation device 411, and the port (2).

If the first monitor value is higher than or equal to the first given value (the first monitor value is normal) and the second monitor value is higher than or equal to the second threshold value (the second monitor value is normal), the fault determination device 416 determines that the dispersion compensation device 411 is in the normal state and provides the result of the determination to, for example, the monitor.

If the first monitor value is higher than or equal to the first threshold value (the first monitor value is normal) and the second monitor value is lower than the second threshold value (the second monitor value is abnormal), the fault determination device 416 determines that the device 411b fails and provides the result of the determination to, for example, the monitor. If the first monitor value is higher than or equal to the first given value, no port connection failure occurs and the connection of the port is normal. If the second monitor value is lower than the second threshold value although no port connection failure occurs, the fault determination device 416 determines that any fault occurs in the device 411b and a loss is caused in the second monitor value.

If the first monitor value is lower than the first given value (the first monitor value is abnormal) and the second monitor value is lower than the second given value (the second monitor value is abnormal), the fault determination device 416 determines that a port connection failure occurs in the To_DCF port or the From_DCF port and provides the result of the determination to, for example, the monitor. When a port connection failure occurs, both of the path of the signal light provided from the CPL 404 to the dispersion compensation device 411 and the path of the signal light provided from the CPL 405 to the dispersion compensation device 411 are in the disconnection state. Accordingly, the first and second monitor values have the no input level.

If the first monitor value is lower than the first given value (the first monitor value is abnormal) and the second monitor value is higher than or equal to the second given value (the second monitor value is normal), the fault determination device 416 determines that the dispersion compensation device 411 is in the wrong connection state and provides the result of the determination to, for example, the monitor.

Upon detection of any of the failure of the device 411b, the port connection failure, and the wrong connection, the fault determination device 416 causes the VOA 407 to increase the loss in the VOA 407. Increasing the loss in the VOA 407 prevents the high-power optical signal from the To_DCF port from being provided to the dispersion compensation device 411.

Figure 12:
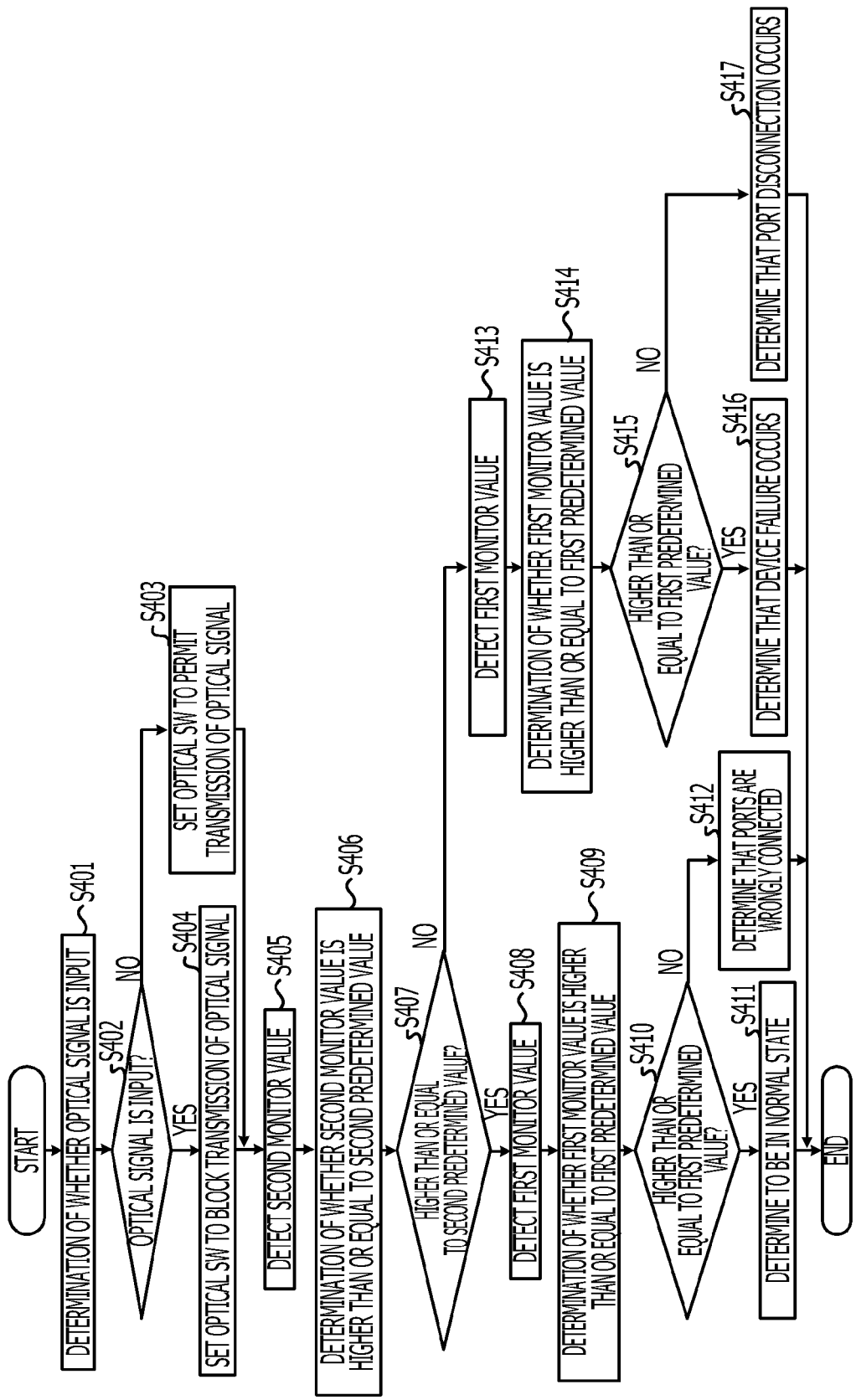
FIG. 12 illustrates an example of a processing process in an optical amplifier apparatus according to the fourth embodiment.

A processing process in the optical amplifier apparatus 400b according to the fourth embodiment will now be described. FIG. 12 illustrates an example of the processing process in the optical amplifier apparatus 400b according to the fourth embodiment. Referring to FIG. 12, in operation S401, the optical SW controller 415 performs determination of whether the optical amplifier apparatus 400b receives an optical signal from the optical amplifier apparatus 400a.

If no optical signal is received (No in operation S402), then in operation S403, the optical SW controller 415 sets the optical SW 414 to permit the transmission of an optical signal and the process goes to operation S405. If an optical signal is received (Yes in operation S402), then in operation S404, the optical SW controller 415 sets the optical SW 414 to block the transmission of an optical signal.

In operation S405, the fault determination device 416 detects the second monitor value from the optical amplifier module 412. In operation S406, the fault determination device 416 performs determination of whether the second monitor value is higher than or equal to the second given value.

If the second monitor value is higher than or equal to the second given value (Yes in operation S407), then in operation S408, the fault determination device 416 detects the first monitor value from the PD 410. In operation S409, the fault determination device 416 performs determination of whether the first monitor value is higher than or equal to the first given value.

If the first monitor value is higher than or equal to the first given value (Yes in operation S410), then in operation S411, the fault determination device 416 determines that the dispersion compensation device 411 is in the normal state. If the first monitor value is lower than the first given value (No in operation S410), then in operation S412, the fault determination device 416 determines that the port are in the wrong connection state.

If the second monitor value is lower than the second given value (No in operation S407), then in operation S413, the fault determination device 416 detects the first monitor value from the PD 410. In operation S414, the fault determination device 416 performs determination of whether the first monitor value is higher than or equal to the first given value.

If the first monitor value is higher than or equal to the first given value (Yes in operation S415), then in operation S416, the fault determination device 416 determines that the device failure occurs. If the first monitor value is lower than the first given value (No in operation S415), then in operation S417, the fault determination device 416 determines that the port disconnection is caused.

As described above, the optical SW controller 415 causes the optical SW 414 to block the LD light from the LD 413 on the basis of whether an optical signal is received from the optical amplifier apparatus 400a in the optical amplifier apparatus 400b according to the fourth embodiment. Accordingly, the abnormal state can be accurately detected regardless of whether an optical signal is received from the optical amplifier apparatus 400a.

When the dispersion compensation device 411 has flat loss characteristics, the LD 413 adjusts the wavelength of the LD light so as to be within the frequency band of the optical signal provided from the optical amplifier apparatus 400a and outputs the adjusted LD light.

When the dispersion compensation device 411 has periodic loss characteristics, the LD 413 adjusts the wavelength of the LD light so that the LD light is transmitted through the dispersion compensation device 411. This is because, if the LD light is provided to the dispersion compensation device 411 without the adjustment of the wavelength, a considerable loss can possibly occur in the device 411b even in the normal state and the second monitor value may not be higher than or equal to the second given value.

Figure 13:
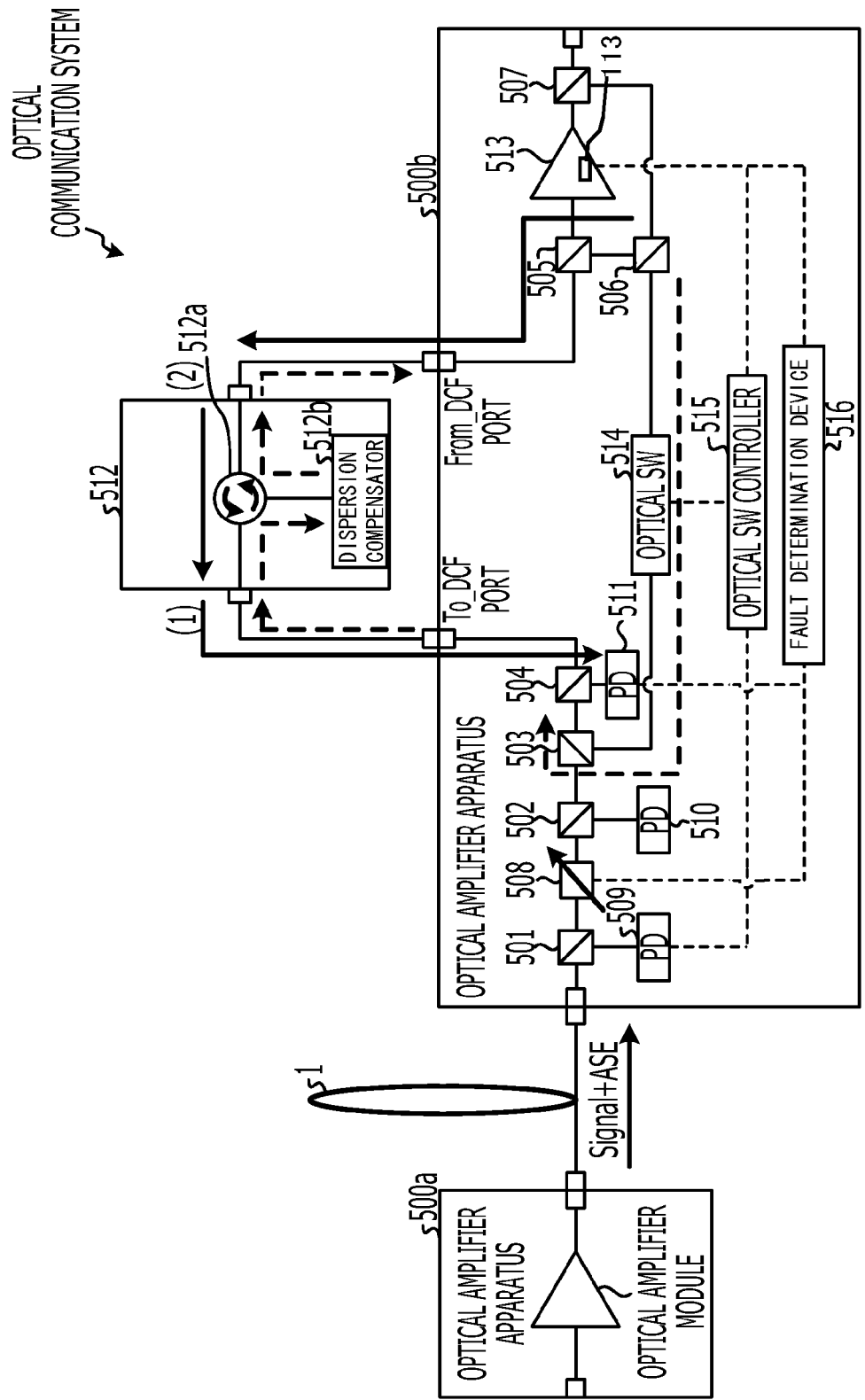
FIG. 13 illustrates an example of the configuration of an optical communication system according to a fifth embodiment of the present invention.

The configuration of an optical communication system according to a fifth embodiment of the present invention will now be described. FIG. 13 illustrates an example of the configuration of the optical communication system according to the fifth embodiment. Referring to FIG. 13, the optical communication system includes an optical amplifier apparatus 500a and an optical amplifier apparatus 500b. Since the optical amplifier apparatus 500a includes the same configuration as that of the optical amplifier apparatus 500b, the configuration of the optical amplifier apparatus 500b will now be described.

The optical amplifier apparatus 500b forces an optical amplifier module 513, instead of an LD, to emit light if no optical signal is received from the optical amplifier apparatus 500a and provides the signal light to a dispersion compensation device 512 to perform fault determination.

Referring to FIG. 13, the optical amplifier apparatus 500b includes CPLs 501 to 507, a VOA 508, PDs 509 to 511, the dispersion compensation device 512, the optical amplifier module 513, an optical SW 514, an optical SW controller 515, and a fault determination device 516.

The CPL 501 splits an optical signal provided from the optical amplifier apparatus 500a into signal components to provide one signal component to the PD 509 and provide the other signal component to the VOA 508. The CPL 502 splits an optical signal provided from the VOA 508 into signal components to provide one signal component to the PD 510 and provide the other signal component to the CPL 503.

The CPL 503 provides an optical signal from the CPL 502 or an optical signal from the CPL 506 to the CPL 504. The CPL 504 provides an optical signal from the CPL 503 to the dispersion compensation device 512. The CPL 504 provides an optical signal from the dispersion compensation device 512 to the PD 511.

The CPL 505 provides an optical signal from the dispersion compensation device 512 to the optical amplifier module 513. The CPL 505 provides an optical signal from the CPL 506 to a From_DCF port.

The CPL 506 splits an optical signal that is received from the CPL 507 into signal components to provide one signal component to the CPL 505 and provide the other signal component to the CPL 503 through the optical SW 514. The CPL 507 splits an optical signal that is received from the optical amplifier module 513 into signal components to provide one signal component to the CPL 506 and externally provide the other signal component.

The VOA 508 is a device that attenuates an optical signal. The VOA 508 receives an optical signal from the CPL 501, attenuates the received optical signal, and provides the attenuated optical signal to the CPL 502. If a fault occurs in, for example, the dispersion compensation device 512, the VOA 508 increases the amount of attenuation to prevent a high-power optical signal from being provided to the dispersion compensation device 512.

The PD 509 is a device that receives an optical signal from the CPL 501 and converts the received optical signal into an electrical signal. The PD 509 provides the electrical signal to a monitor and the optical SW controller 515. The PD 510 is a device that receives an optical signal from the CPL 502 and converts the received optical signal into an electrical signal. The PD 510 provides the electrical signal to the monitor.

The PD 511 is a device that receives an optical signal from the CPL 504 and converts the received optical signal into an electrical signal. The PD 511 provides the electrical signal to the fault determination device 516.

The dispersion compensation device 512 causes an appropriate delay for every wavelength in an optical signal that is received from the CPL 504 to compensate the dispersion existing in the optical signal. The dispersion compensation device 512 includes a circulator 512a and a device 512b performing the dispersion compensation.

The dispersion compensation device 512 is connected to a To_DCF port and the From_DCF port. A connection method in which a port (1) of the dispersion compensation device 512 is connected to the To_DCF port and a port (2) of the dispersion compensation device 512 is connected to the From_DCF port corresponds to the normal connection.

An optical signal input from the port (1) of the dispersion compensation device 512 is input into the device 512b through the circulator 512a. The optical signal subjected to the dispersion compensation in the device 512b is output from the port (2) through the circulator 512a. In contrast, an optical signal input from the port (2) of the dispersion compensation device 512 is output from the port (1) not through the device 512b.

The optical amplifier module 513 is a device that receives an optical signal from the CPL 505, amplifies the received optical signal, and outputs the amplified optical signal. The optical amplifier module 513 includes a PD. The optical amplifier module 513 converts the optical signal into an electrical signal with the PD and provides the resulting electrical signal to the fault determination device 516. When a control instruction to force the optical amplifier module 513 to emit light is received, the optical amplifier module 513 provides the optical signal to the CPL 507.

The optical SW 514 blocks the transmission of an optical signal from the CPL 506 on the basis of a control instruction from the optical SW controller 515.

The optical SW controller 515 is a processor that controls the optical SW 514 on the basis of an electrical signal from the PD 509. If the optical SW controller 515 receives an electrical signal from the PD 509, the optical SW controller 515 provides a control instruction to block the transmission of an optical signal to the optical SW 514. In contrast, if the optical SW controller 515 does not receive an electrical signal from the PD 509, the optical SW controller 515 provides a control instruction to permit the transmission of an optical signal to the optical SW 514.

The fault determination device 516 is a processor that determines any fault concerning the dispersion compensation device 512. The fault determination device 516 includes a first given value and a second given value. The fault determination device 516 compares the value of the electrical signal received from the PD 511 with the first given value and compares the value of the electrical signal received from the PD in the optical amplifier module 513 with the second given value to determine any fault on the basis of the result of the comparison.

The value of the electrical signal received from the PD 511 is hereinafter referred to as a first monitor value, and the value of the electrical signal received from the PD in the optical amplifier module 513 is hereinafter referred to as a second monitor value. A first threshold value indicates a value that is set so as to reflect the loss of the optical signal transmitted through the port (2) and the port (1), not through the device 512b in the dispersion compensation device 512. A second threshold value indicates a value that is set so as to reflect the loss of the optical signal transmitted through the port (1), the device 512b in the dispersion compensation device 512, and the port (2).

If the first monitor value is higher than or equal to the first given value (the first monitor value is normal) and the second monitor value is higher than or equal to the second threshold value (the second monitor value is normal), the fault determination device 516 determines that the dispersion compensation device 512 is in the normal state and provides the result of the determination to, for example, the monitor.

If the first monitor value is higher than or equal to the first threshold value (the first monitor value is normal) and the second monitor value is lower than the second threshold value (the second monitor value is abnormal), the fault determination device 516 determines that the device 512b fails and provides the result of the determination to, for example, the monitor. If the first monitor value is higher than or equal to the first given value, no port connection failure occurs and the connection of the port is normal. If the second monitor value is lower than the second threshold value although no port connection failure occurs, the fault determination device 516 determines that any fault occurs in the device 512b and a loss is caused in the second monitor value.

If the first monitor value is lower than the first given value (the first monitor value is abnormal) and the second monitor value is lower than the second given value (the second monitor value is abnormal), the fault determination device 516 determines that a port connection failure occurs in the To_DCF port or the From_DCF port and provides the result of the determination to, for example, the monitor. When a port connection failure occurs, both of the path of the signal light provided from the CPL 504 to the dispersion compensation device 512 and the path of the signal light provided from the CPL 505 to the dispersion compensation device 512 are in the disconnection state. Accordingly, the first and second monitor values have the no input level.

If the first monitor value is lower than the first given value (the first monitor value is abnormal) and the second monitor value is higher than or equal to the second given value (the second monitor value is normal), the fault determination device 516 determines that the dispersion compensation device 512 is in the wrong connection state and provides the result of the determination to, for example, the monitor.

Upon detection of any of the failure of the device 512b, the port connection failure, and the wrong connection, the fault determination device 516 causes the VOA 508 to increase the loss in the VOA 508. Increasing the loss in the VOA 508 prevents the high-power optical signal from the To_DCF port from being provided to the dispersion compensation device 512.

Figure 14:
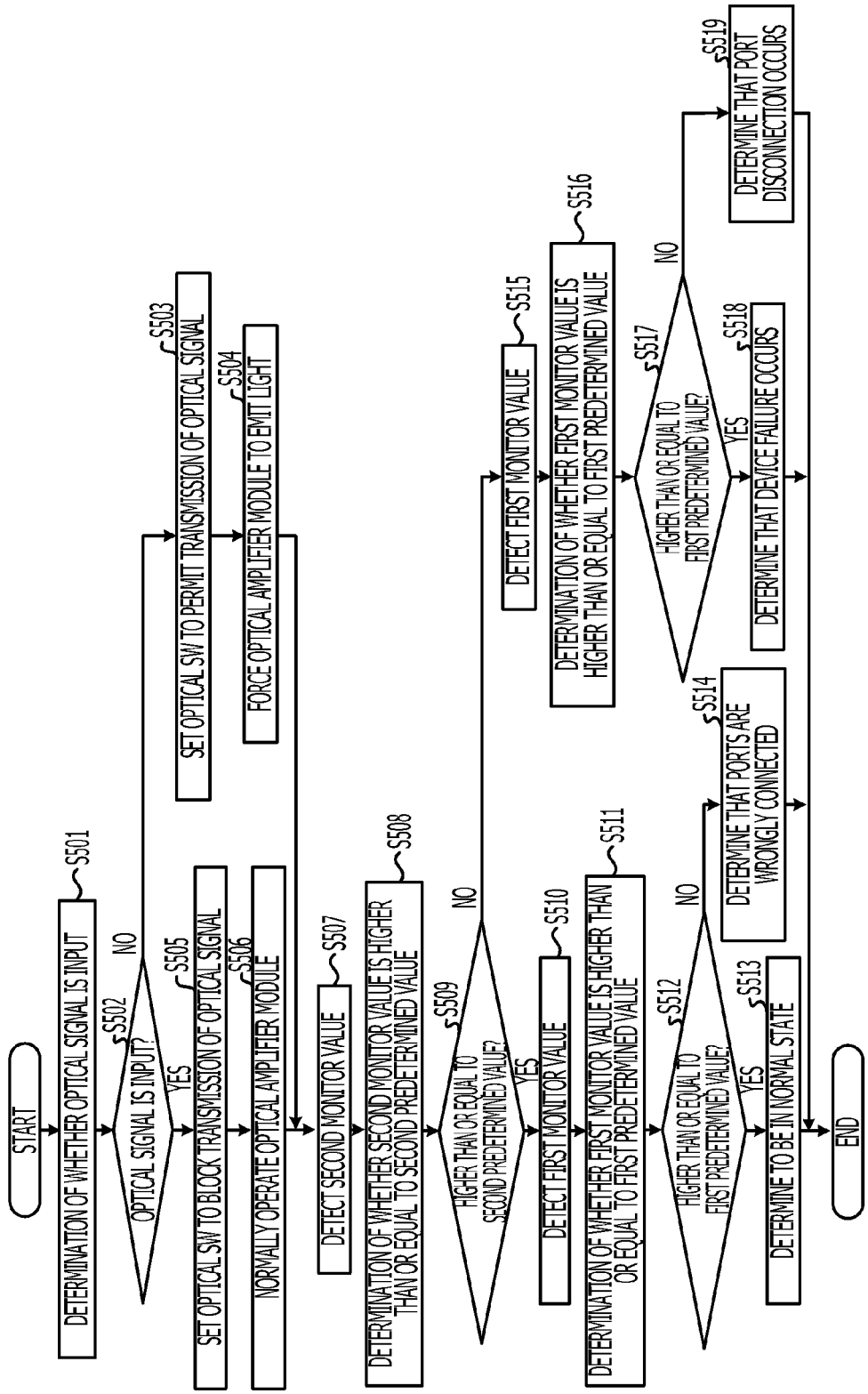
FIG. 14 illustrates an example of a processing process in an optical amplifier apparatus according to the fifth embodiment.
Figure 15:
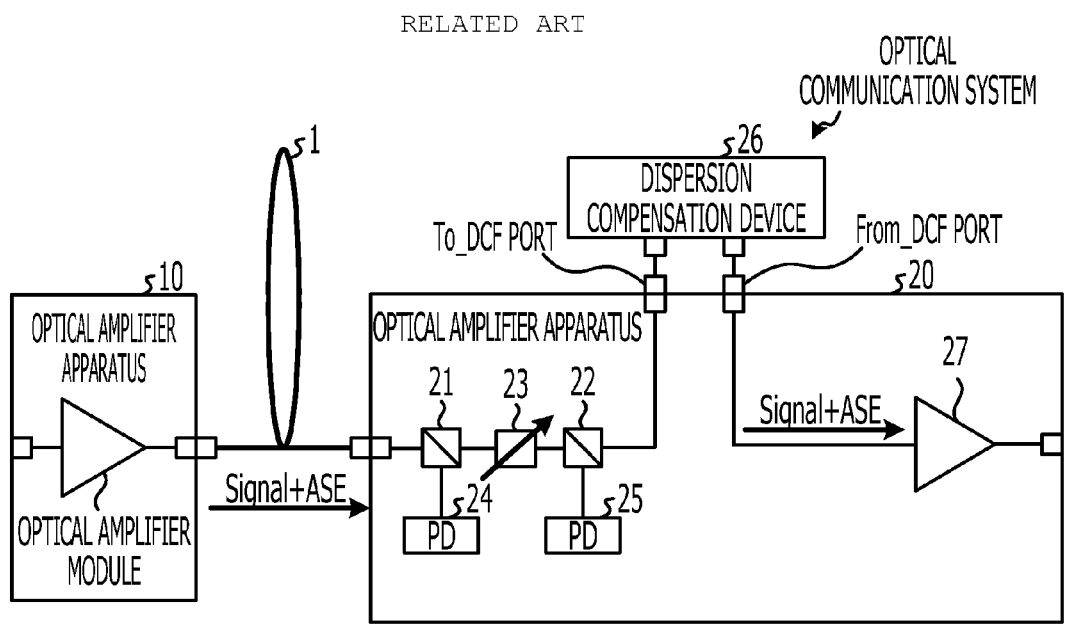
FIG. 15 illustrates an example of the configuration of an optical communication system in related art.
Figure 16:
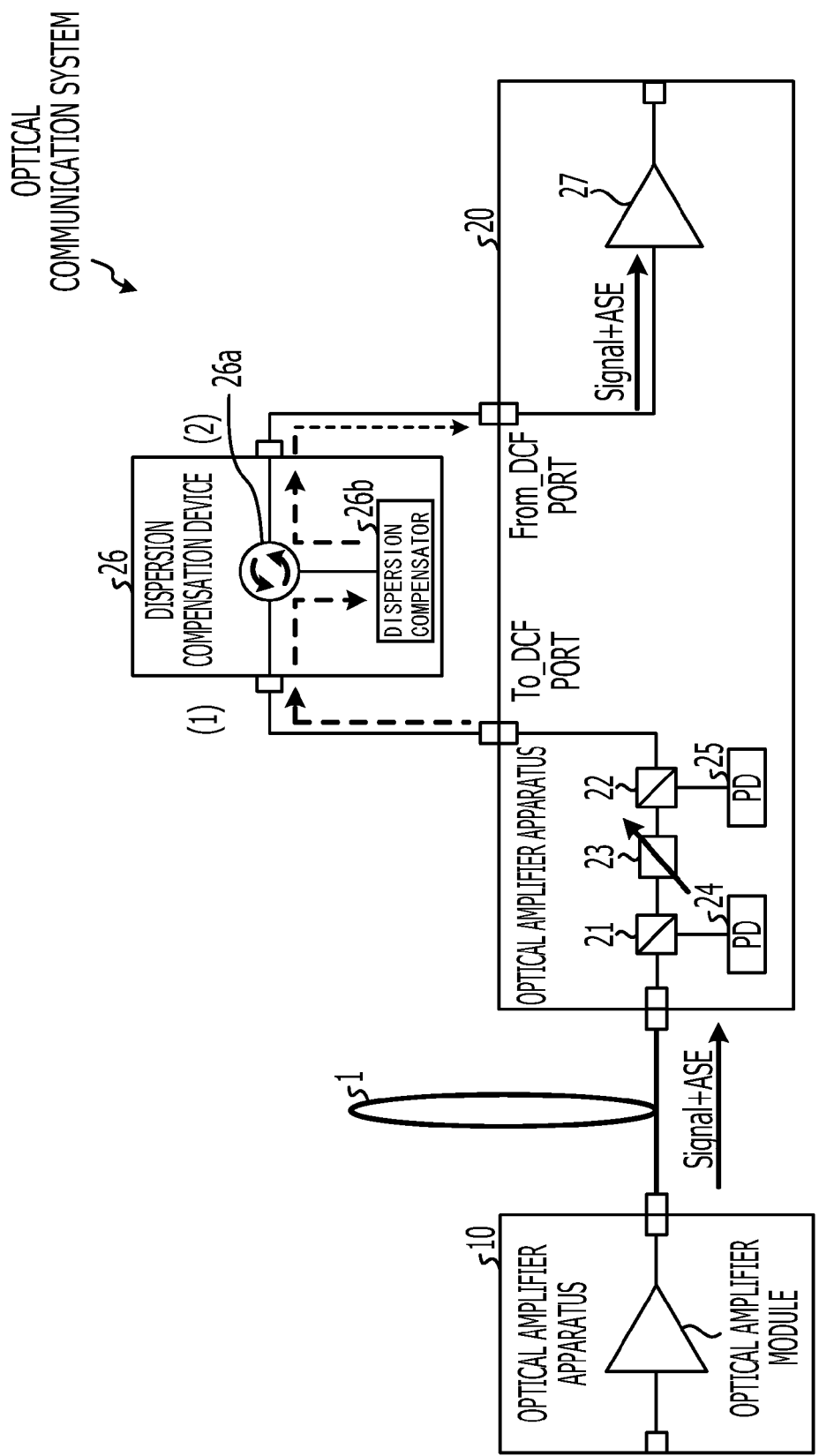
FIG. 16 is a diagram describing a problem in the related art.
Figure 17:
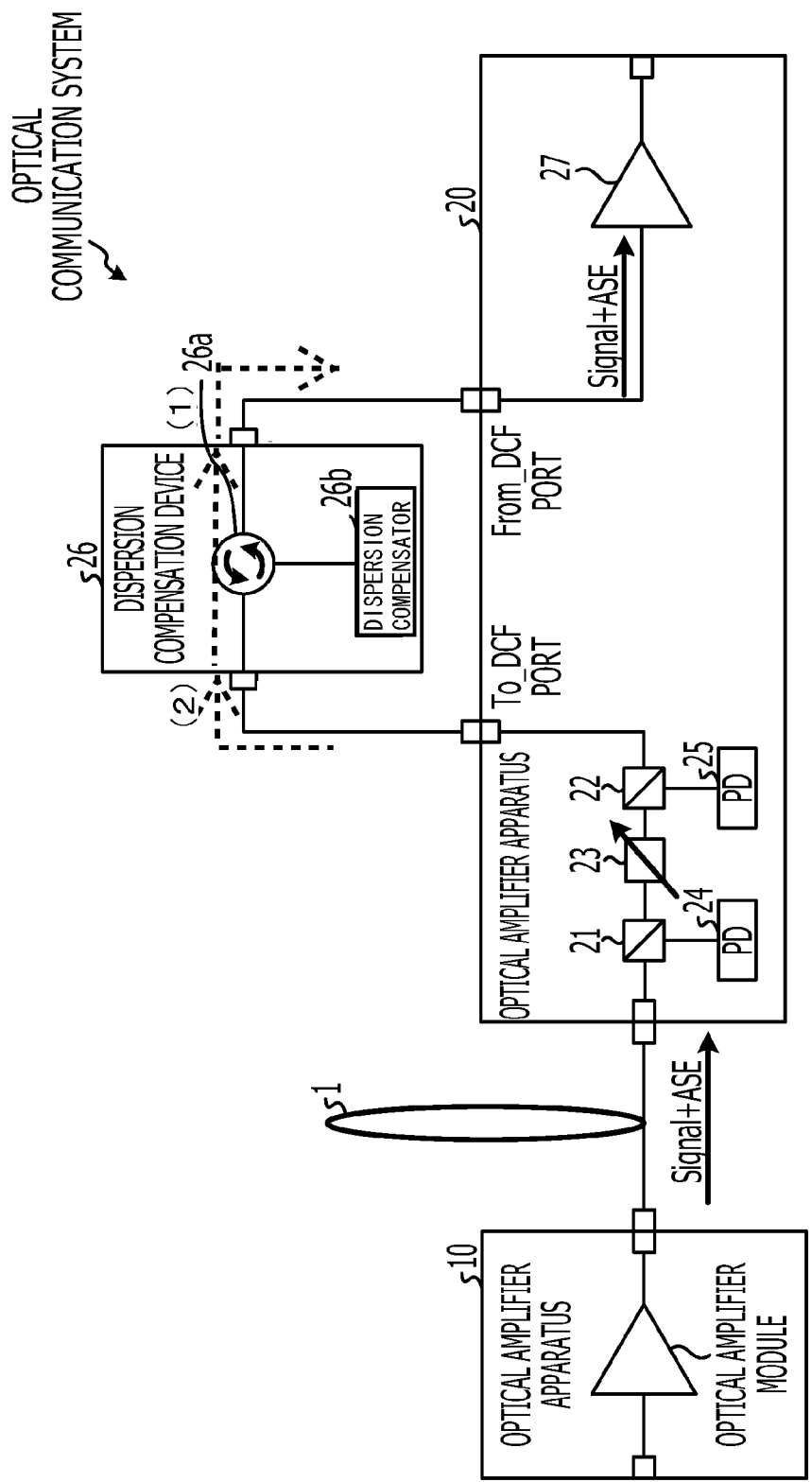
FIG. 17 is another diagram describing a problem in the related art.

A processing process in the optical amplifier apparatus 500b according to the fifth embodiment will now be described. FIG. 14 illustrates an example of the processing process in the optical amplifier apparatus 500b according to the fifth embodiment. Referring to FIG. 14, in operation S501, the optical SW controller 515 performs determination of whether the optical amplifier apparatus 500b receives an optical signal on the basis of the electrical signal provided from the PD 509.

If no optical signal is received (No in operation S502), then in operation S503, the optical SW controller 515 sets the optical SW 514 to permit the transmission of an optical signal. In operation S504, the optical SW controller 515 forces the optical amplifier module 513 to emit light and the process goes to operation S507.

If an optical signal is received (Yes in operation S502), then in operation S505, the optical SW controller 515 sets the optical SW 514 to block the transmission of an optical signal. In operation S506, the optical SW controller 515 normally operates the optical amplifier module 513.

In operation S507, the fault determination device 516 detects the second monitor value from the optical amplifier module 513. In operation S508, the fault determination device 516 performs determination of whether the second monitor value is higher than or equal to the second given value. If the second monitor value is higher than or equal to the second given value (Yes in operation S509), then in operation S510, the fault determination device 516 detects the first monitor value from the PD 511.

In operation S511, the fault determination device 516 performs determination of whether the first monitor value is higher than or equal to the first given value. If the first monitor value is higher than or equal to the first given value (Yes in operation S512), then in operation S513, the fault determination device 516 determines that the dispersion compensation device 512 is in the normal state. If the first monitor value is lower than the first given value (No in operation S512), then in operation S514, the fault determination device 516 determines that the port are in the wrong connection state.

If the second monitor value is lower than the second given value (No in operation S509), then in operation S515, the fault determination device 516 detects the first monitor value from the PD 511. In operation S516, the fault determination device 516 performs determination of whether the first monitor value is higher than or equal to the first given value.

If the first monitor value is higher than or equal to the first given value (Yes in operation S517), then in operation S518, the fault determination device 516 determines that the device failure occurs. If the first monitor value is lower than the first given value (No in operation S517), then in operation S519, the fault determination device 516 determines that the port disconnection is caused.

As described above, the optical amplifier apparatus 500b according to the fifth embodiment forces the optical amplifier module 513, instead of an LD, to emit light if no optical signal is received from the optical amplifier apparatus 500a, so that the optical amplifier apparatus 500b can accurately determine any fault in the dispersion compensation device 512 regardless of whether an optical signal is received.

Although the first monitor value and the second monitor value are compared with the first given value and the second given value, respectively, to determine any fault in the first to fifth embodiments, the present invention is not limited to the above determination. Any parameter may be used, instead of the first and second given values, as long as it can be determined whether the first monitor value and the second monitor value are abnormal.

Among the processes described in the above embodiments, all or some of the processes described to be automatically performed may be manually performed and all or some of the processes described to be manually performed may be automatically performed. Information including the processing processes, the control processes, the specific names, a variety of data, and the parameters described in the above description and illustrated in the drawings may be arbitrarily varied, except otherwise specified.

Although the dispersion compensation device is exemplified as the dispersion compensator, for example, an optical amplifier including a Mach-Zehnder external optical modulator, an optical branching device, a wavelength demultiplexer, and an optical isolator and a gain equalizer may be used.

According to an aspect of the embodiments of the invention, any combinations of one or more of the described features, functions, operations, and/or benefits can be provided. A combination can be one or a plurality. The embodiments can be implemented as an apparatus (a machine) that includes optical transceiving hardware in combination with computing hardware including hardware logic and/or circuitry (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use optical transceiving hardware, computing hardware and/or software. For example, the fault determination devices (112, 212, 315, 416, 516) can be implemented as a computing apparatus and/or software. A computing apparatus can comprise a controller (CPU) (e.g., a hardware logic and/or circuitry based computer processor that processes or executes instructions, namely software/program), computer readable recording media, transmission communication media interface (network interface), and/or an output device, such as a display device, all in communication through a data communication bus. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing one or more apparatuses and/or computer processors to execute the described operations. The results produced can be displayed on the display.

A program/software implementing the embodiments may be recorded on a computer-readable media, e.g., a non-transitory computer-readable medium. The program/software implementing the embodiments may also be transmitted over a transmission communication path, e.g., a network implemented via hardware. Examples of the non-transitory computer-readable recording media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments have been described in detail, it should be understood that the various changes, substitutions, and alterations could be made hereto without departing from the spirit and scope of the invention.

What is claimed is:

1. An optical transmission apparatus comprising:
    a non-reciprocal device including first to second ports, an optical signal input from the first port being provided to the second port, an optical signal input from the second port being provided to the first port;
    a dispersion compensator that is coupled to the first port of the non-reciprocal device and that conducts given processing to an optical signal input from the first port of the non-reciprocal device to provide the optical signal subjected to the given processing to the second port of the non-reciprocal device;
    a first monitor configured to monitor an optical signal output from the first port;
    a second monitor configured to monitor an optical signal output from the second port; and
    a fault determination device configured to determine a connection failure at the first port, the second port, or both of the non-reciprocal device and/or determine a connection state of the dispersion compensator to the non-reciprocal device, based upon a value monitored by the first monitor for the optical signal output from the first port of the non-reciprocal device and a value monitored by the second monitor for the optical signal output from the second port of the non-reciprocal device.

2. The optical transmission apparatus according to claim 1, further comprising:
    a coupler that receives an optical signal from an external apparatus and, while the received optical signal is being provided through the first port and the second port, provides an optical signal through the second port and the first port.

3. The optical transmission apparatus according to claim 2, further comprising an optical signal device,
    wherein the coupler provides an optical signal output from the optical signal device to each of the first port and the second port while no optical signal is received from the external apparatus.

4. The optical transmission apparatus according to claim 2, further comprising:
    an optical switch that receives an optical signal from the external apparatus, provides the received optical signal to the first port or the second port, and switches the destination of an optical signal output from the coupler to the first port or the second port.

5. The optical transmission apparatus according to claim 1, further comprising:
    an amplifier that amplifies an optical signal output from the first port or the second port; and
    a controller that causes the amplifier to emit light based on whether an optical signal is received from an external apparatus and provides the light to the first port and the second port.

6. The optical transmission apparatus according to claim 1, further comprising:
    an attenuator that attenuates an optical signal input into the non-reciprocal device based on the determination in the fault determination device.

7. The optical transmission apparatus according to claim 2,
    wherein the coupler outputs an optical signal if the fault determination device determines one of the connection failure that occurs at least at one of the first port, the second port and an abnormal state that occurs in the dispersion compensator.

8. A fault detection method in an optical transmission apparatus including first to second ports, a non-reciprocal device, and a dispersion compensator, the method comprising:
    providing by the non-reciprocal device an optical signal input from the first port to the second port and providing an optical signal input from the second port to the first port;
    conducting given processing to an optical signal input from the first port of the non-reciprocal device to provide the optical signal subjected to the given processing to the second port of the non-reciprocal device by the dispersion compensator, which is connected to the first port of the non-reciprocal device;
    receiving an optical signal output from at least one the first port, the second port; and
    detecting a connection failure at the first port, second port, or both of the non-reciprocal device and/or determine a connections state of the dispersion compensator to the non-reciprocal device, based upon a value monitored for the optical signal output from the first port of the non-reciprocal device and a value monitored for the optical signal output from the second port of the non-reciprocal device.

9. The fault detection method according to claim 8, wherein the optical transmission apparatus further includes a coupler outputting an optical signal, the method further comprising:
    providing an optical signal from an external apparatus and, while the optical signal is being provided through the first port or the second port, providing an optical signal through to the second port or the first port.

10. The fault detection method according to claim 9, further comprising:
    providing by the coupler an optical signal output from an optical signal device to each of the first port and the second port while no optical signal is provided from the external apparatus.

* * * * *